Aug. 4, 1964                L. D. DE SEGUIN DES HONS            3,143,393
            APPARATUS FOR AUTOMATICALLY PERFORMING CHEMICAL OPERATIONS
Filed June 13, 1960         AND SIMILAR OR RELATED OPERATIONS
                                                           16 Sheets-Sheet 1

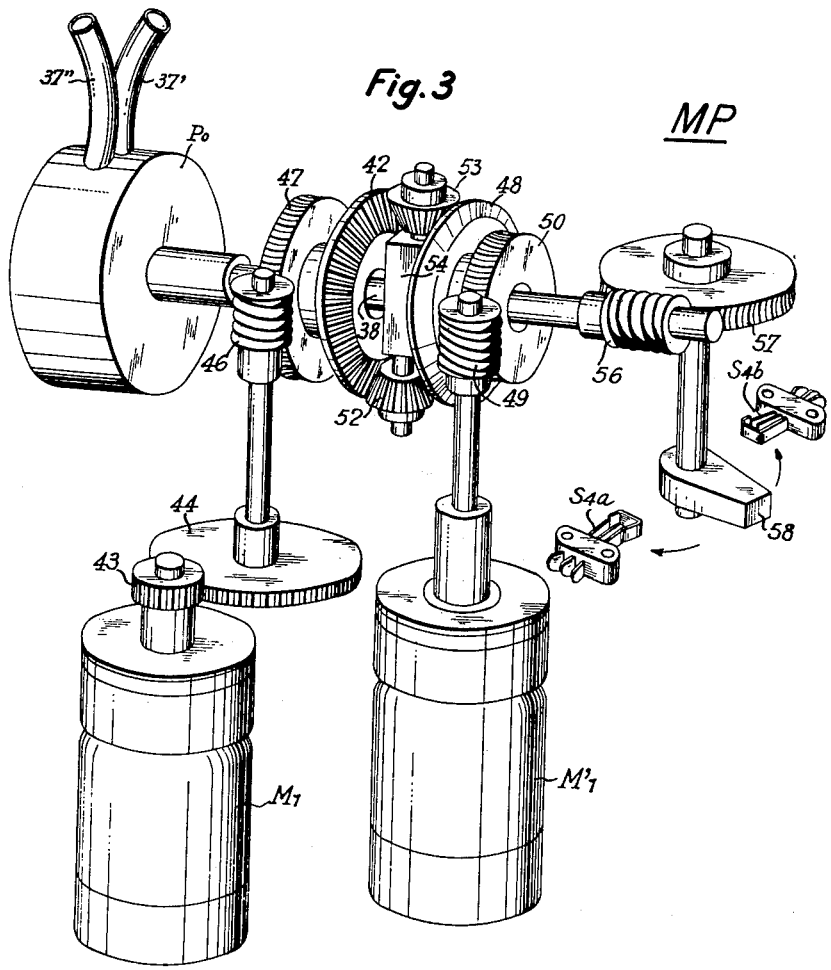
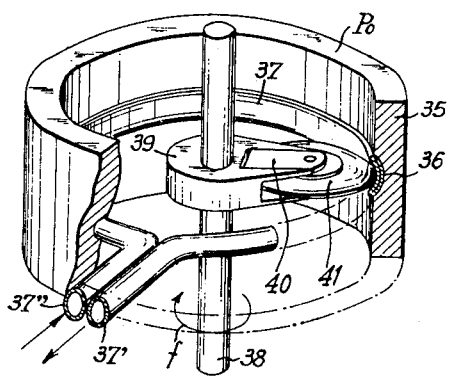

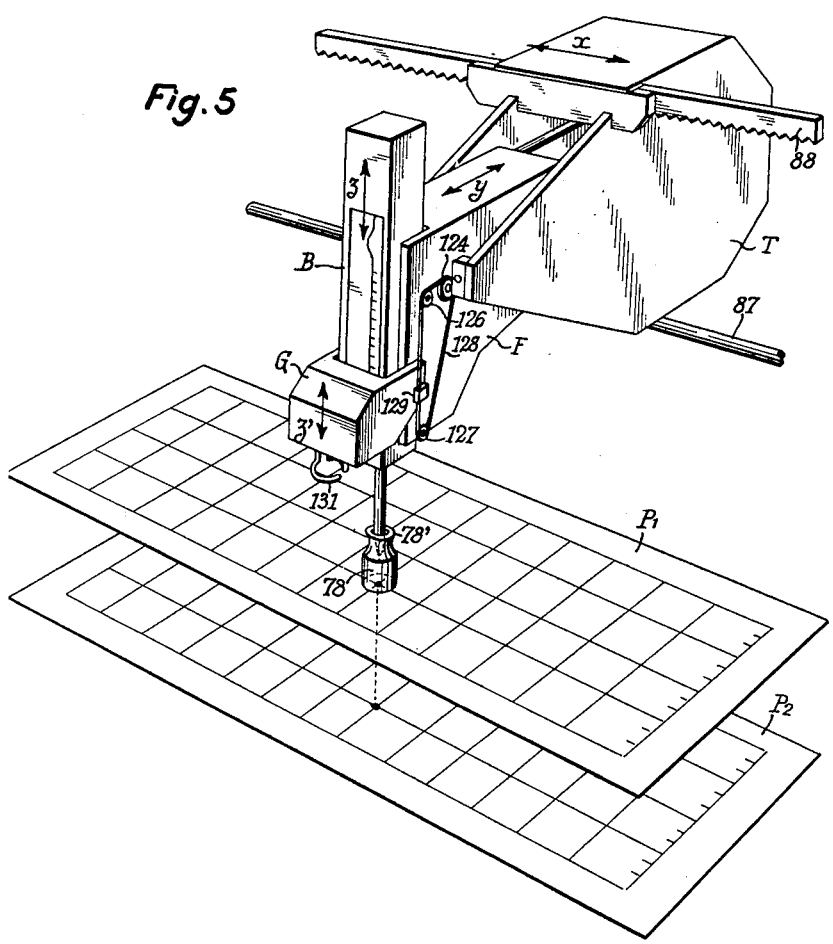

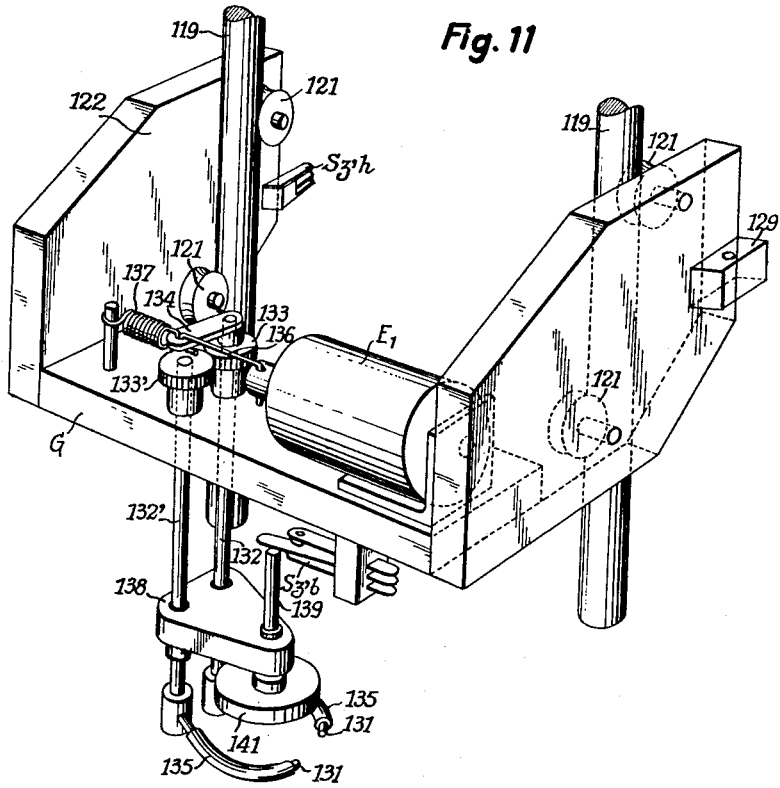

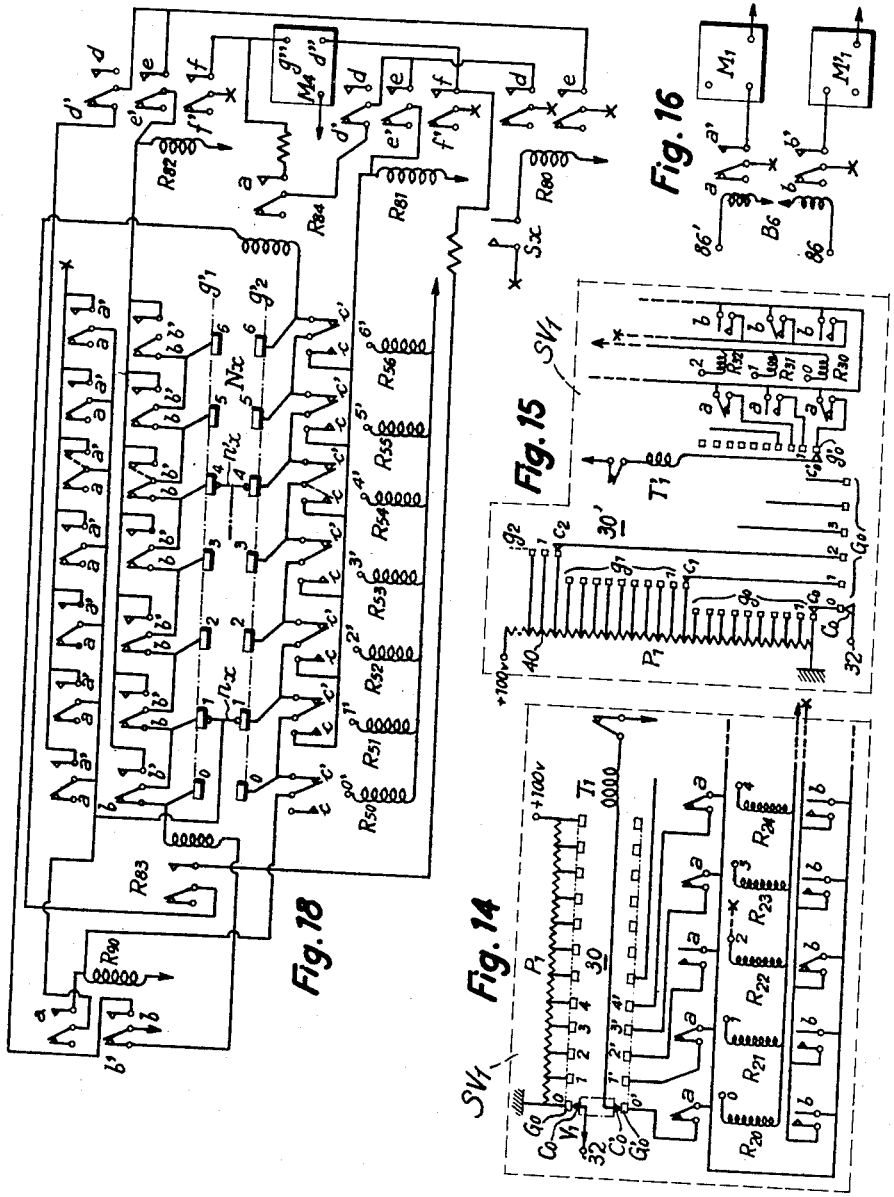

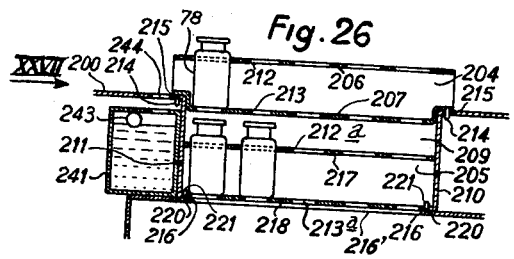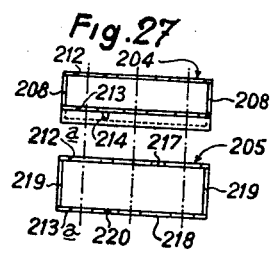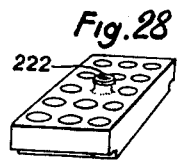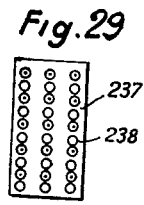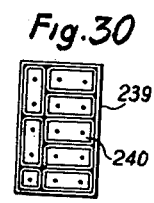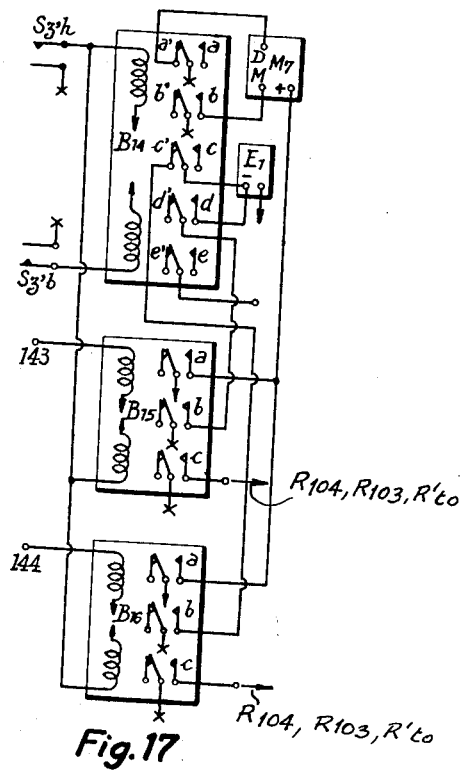

United States Patent Office 3,143,393
Patented Aug. 4, 1964

3,143,393
APPARATUS FOR AUTOMATICALLY PERFORMING CHEMICAL OPERATIONS AND SIMILAR OR RELATED OPERATIONS
Luc Donald de Seguin des Hons, 6 Rue Rene Brement, Drancy, France
Filed June 13, 1960, Ser. No. 35,654
25 Claims. (Cl. 23—253)

This invention relates to apparatus for automatically performing operations such as dosages or analyses in mineral or organical chemistry, biochemistry, radio-chemistry; or similar operations such as in pharmaceutical preparations, perfume preparations, distributions of microbial suspensions, distributions of serologic reactions, distributions of red blood corpuscles, serum and reagents to determine blood groups, distributions of radioactive solutions preparations of radio-isotope dilutions, determinations of physical and physio-chemical characteristics: volume, weight, conductivity, pH, cryoscopic point, spectral absorption, etc., or related operations such as displacement, washing, drying of the vessels, heating, agitation, centrifugation of the solutions, result recording, etc.

With conventional equipment, most of the above mentioned operations generally are performed manually, under the careful supervision of a qualified operator, which requires time and attention, and does not eliminate risk of errors due to negligence of the operator which in certain cases, for example when radioactive materials are treated, may be dangerous.

According to the present invention there is provided apparatus for automatically carrying out chemical and like or related operations, including in combination a main pipette, a motor-driven pump set adapted to produce a circulation of fluid in the pipette, and a device for controlling the said circulation.

Automatic apparatus in accordance with the invention do not require specially qualified operators, and in cases when the automation has been carried very far, they are operative, without the intervention of an operator. On the other hand, they may be remote controlled, which eliminates all danger as concerns radioactive explosive substances or other dangerous materials. As to the results, risk of errors is reduced, and they are obtained in a very short time. Furthermore, the apparatus according to the invention may be adapted to reproduce automatically, as many times as desired, predetermined operation cycles, said cycles being not necessarily fixed by the construction or the adjustment of the apparatus, but may be set easily, and without error, by the user himself, according to the present or future needs of his enterprise; in other terms, the user is not limited to one or several predetermined cycles, but by simple adjustment of his apparatus, he can obtain all the automatic cycles he wants.

For a better understanding of the present invention and to show how the same may be carried into effect reference will now be made to the accompanying drawings in which:

FIGURE 3 is a simplified perspective view of a motor driven pump group controlling the flow of a fluid in the pipette.

FIGURE 4 is a simplified perspective view, partially sectional, of the pump shown in the group of FIGURE 3.

FIGURE 5 is a simplified perspective view of apparatus provided for automatically moving the pipette and the vessels; in this figure, the pipette unit shown in FIGURE 2 is marked B.

Figure 6:
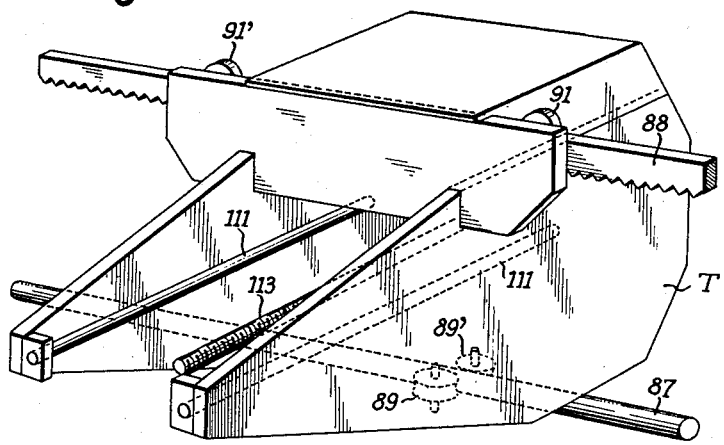
Figure 7:
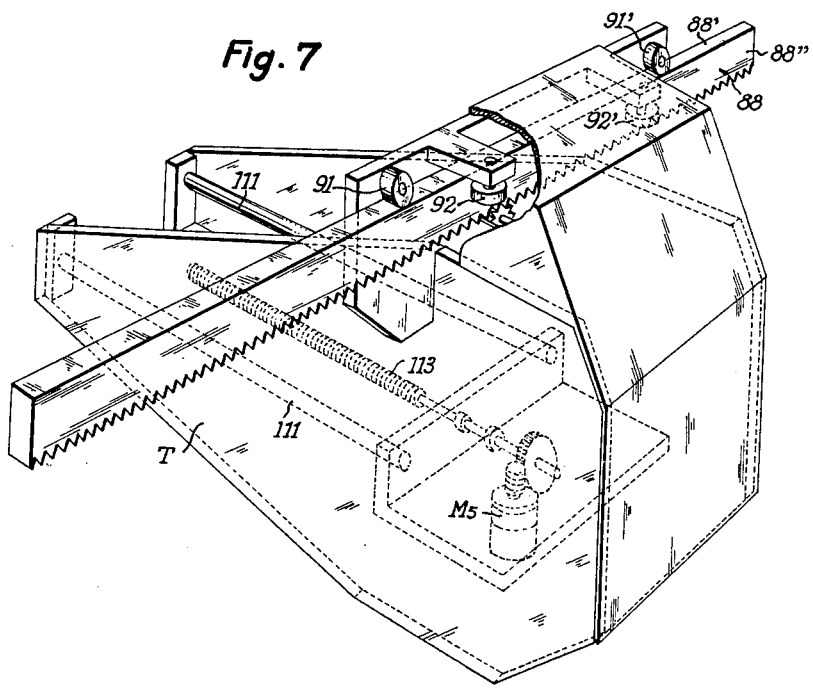

FIGURES 6 and 7 are simplified perspective views of the transversal carriage T of the apparatus of FIGURE 5; FIGURE 6 is a front view corresponding to that of FIGURE 5; FIGURE 7 is a back view, the protection housing being partially cut off to show part of the mechanism ensuring the transversal move of carriage T.

Figure 8:
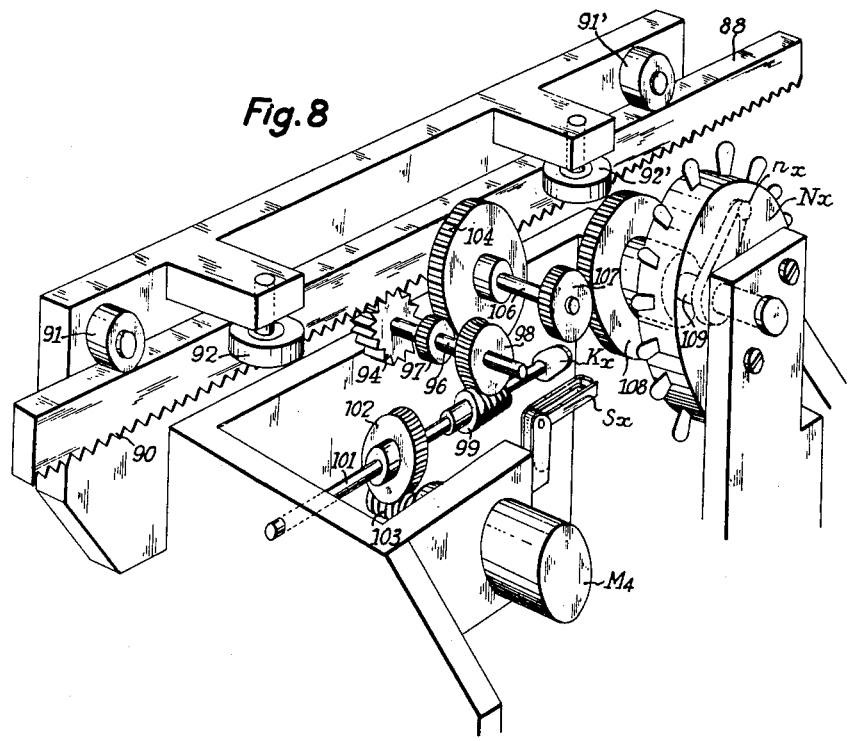

FIGURE 8 is a perspective view of this mechanism and corresponds to a view of the upper part of the carriage of FIGURE 7, with the upper protection flange removed.

Figure 9:
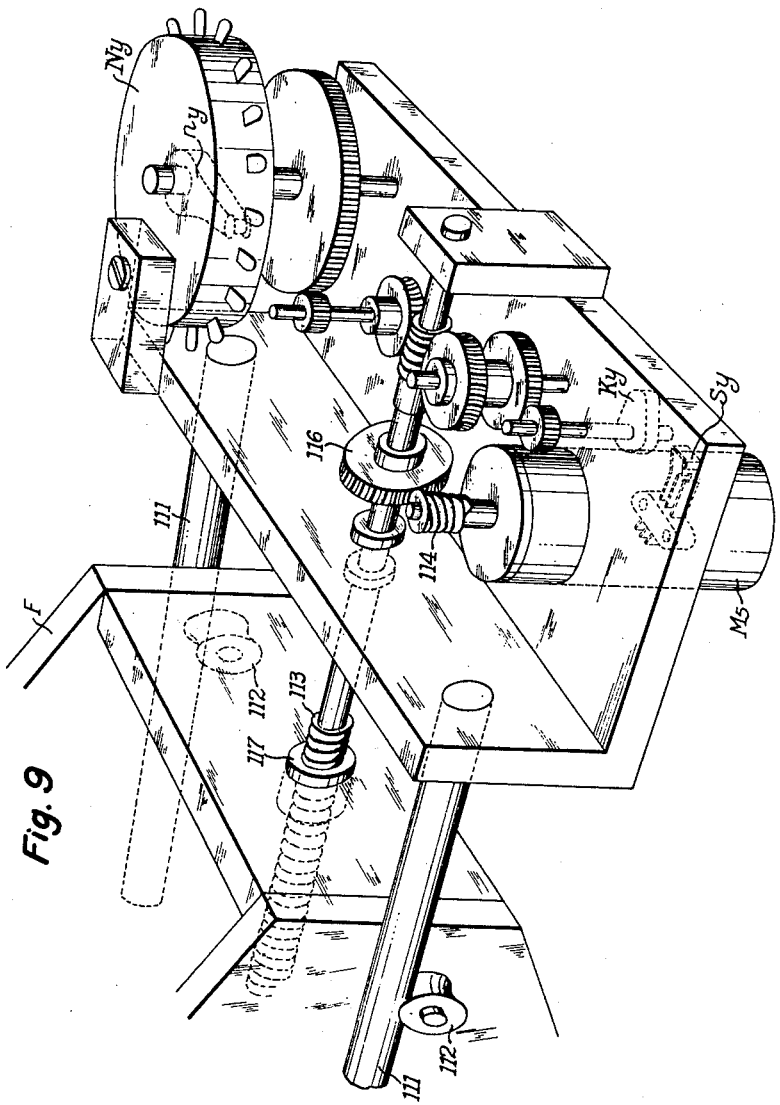

FIGURE 9 is a perspective view of the mechanism for moving the front carriage F of the apparatus of FIGURE 5.

Figure 10:
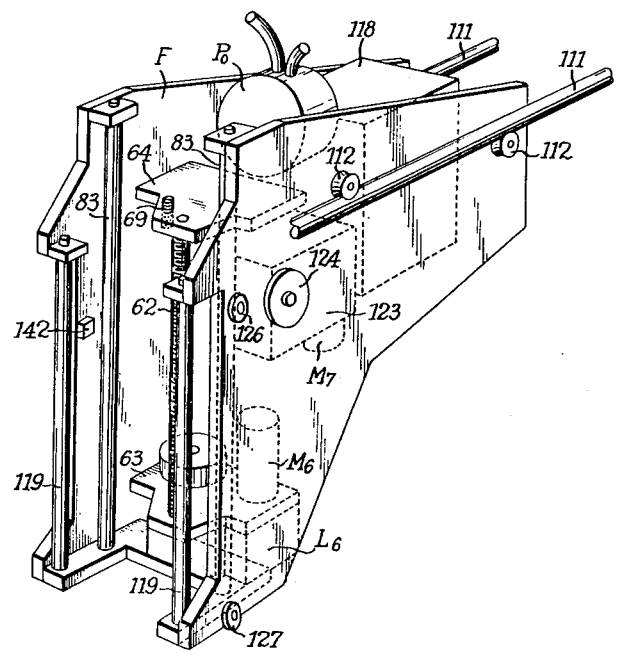

FIGURE 10 is a simplified perspective view of this front carriage.

FIGURE 11 is a perspective view of the gripping carriage or unit G of FIGURE 5, i.e. of the assembly of devices provided to grip and move the vessels vertically.

Figure 12:
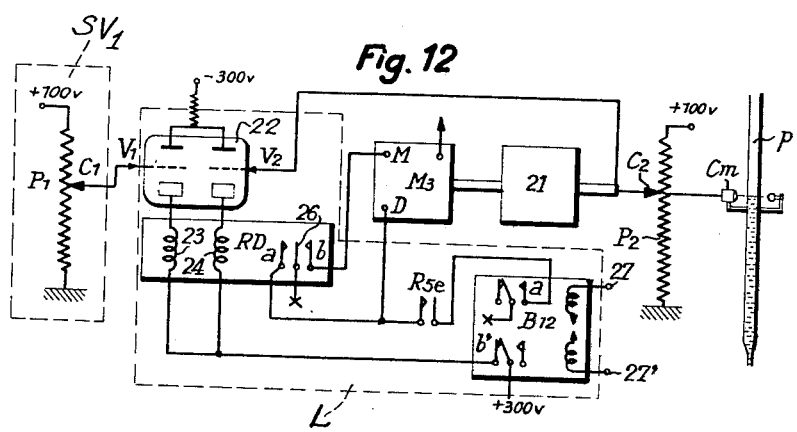

FIGURE 12 is a diagram showing a device for determining the level of the fluid in the pipette.

Figure 13:
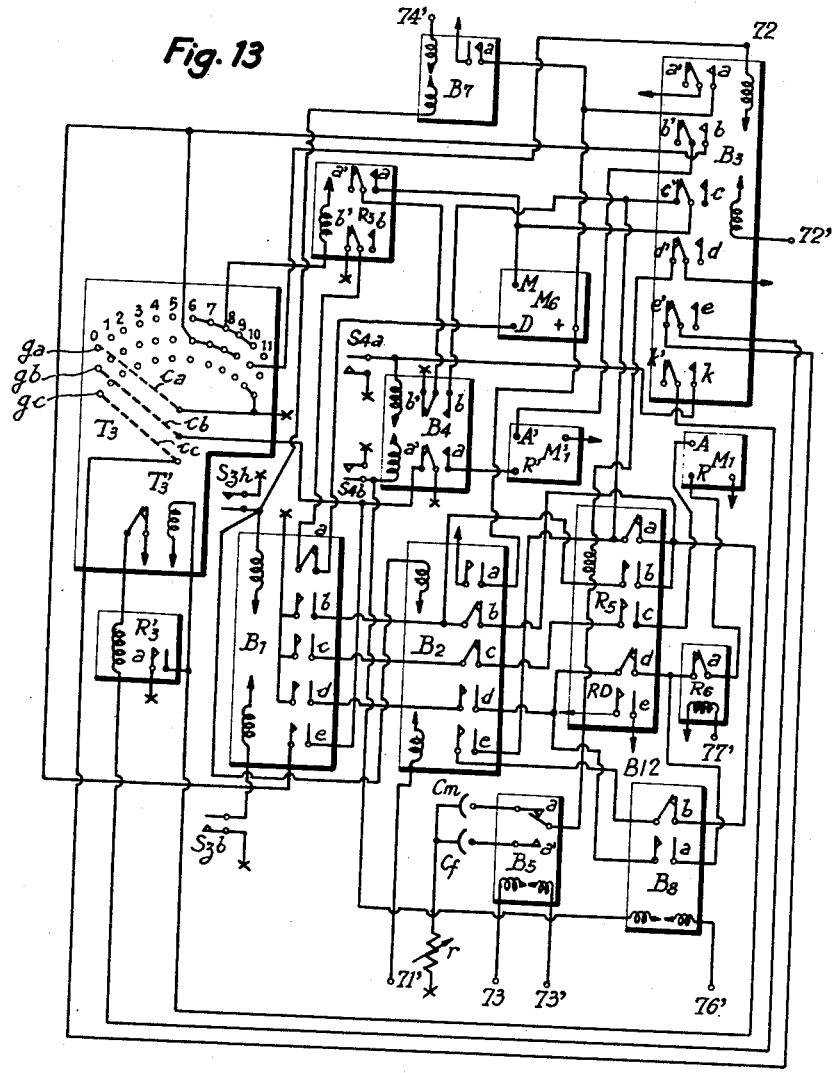

FIGURE 13 is a diagram showing an electrical circuit for the control of the fluid flow in the pipette.

FIGURE 14 shows schematically a predetermined D.C. electrical voltage producing apparatus.

FIGURE 15 shows schematically apparatus derived from that of FIGURE 14.

FIGURE 16 is the diagram of an additional control for the motor pump group.

FIGURE 17 is a diagram showing the electrical circuit for controlling the gripping unit of FIGURE 11.

FIGURE 18 is a diagram showing the electrical circuit associated with the mechanism illustrated in FIGURE 8 for controlling the position of the transversal carriage.

Figure 19:
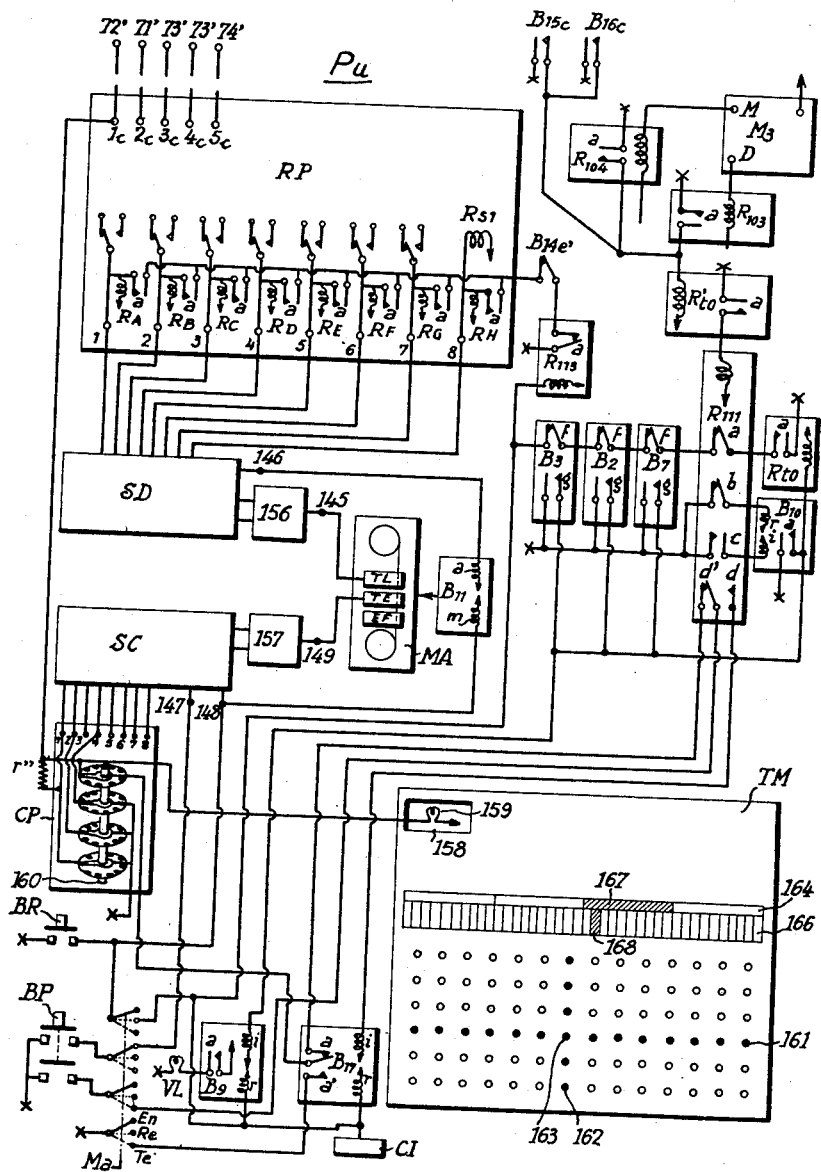

FIGURE 19 is a general diagram of an arrangement which allows recording and automatic reproduction of operation cycles.

Figure 20:
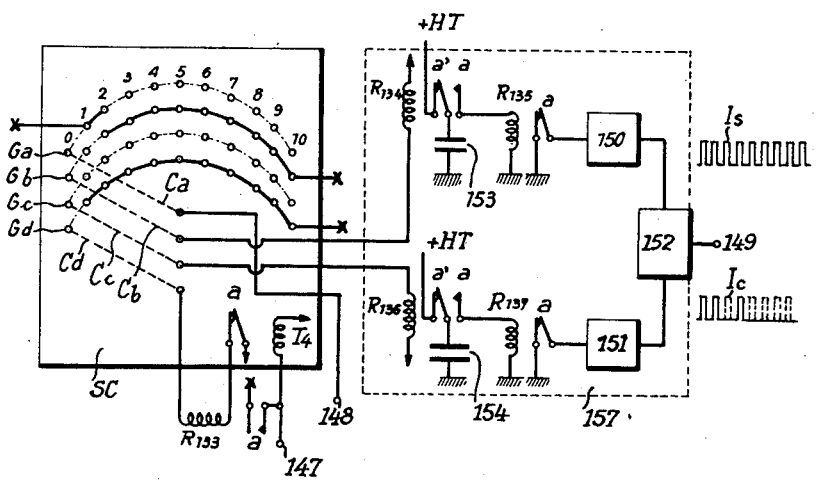

FIGURE 20 is a diagram of the coding selector and of the pulse grouping set-up, represented respectively by units SC and 157 in FIGURE 19.

Figure 21:
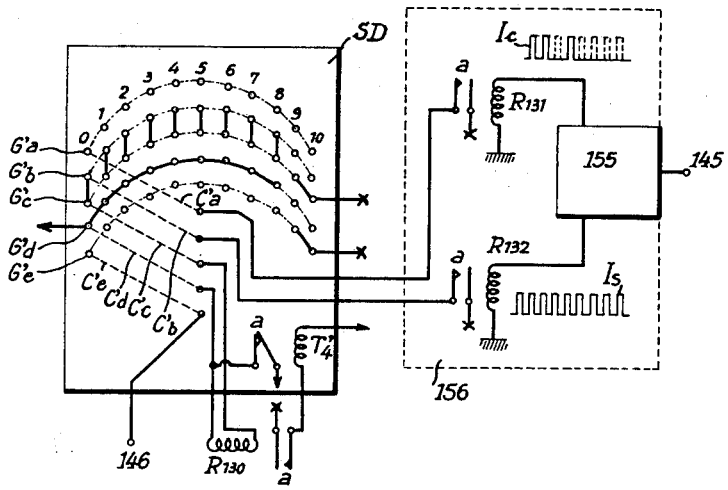

FIGURE 21 is a diagram of the decoding selector and of the pulse separating set-up, represented respectively by units SD and 156, in FIGURE 19.

Figure 22:
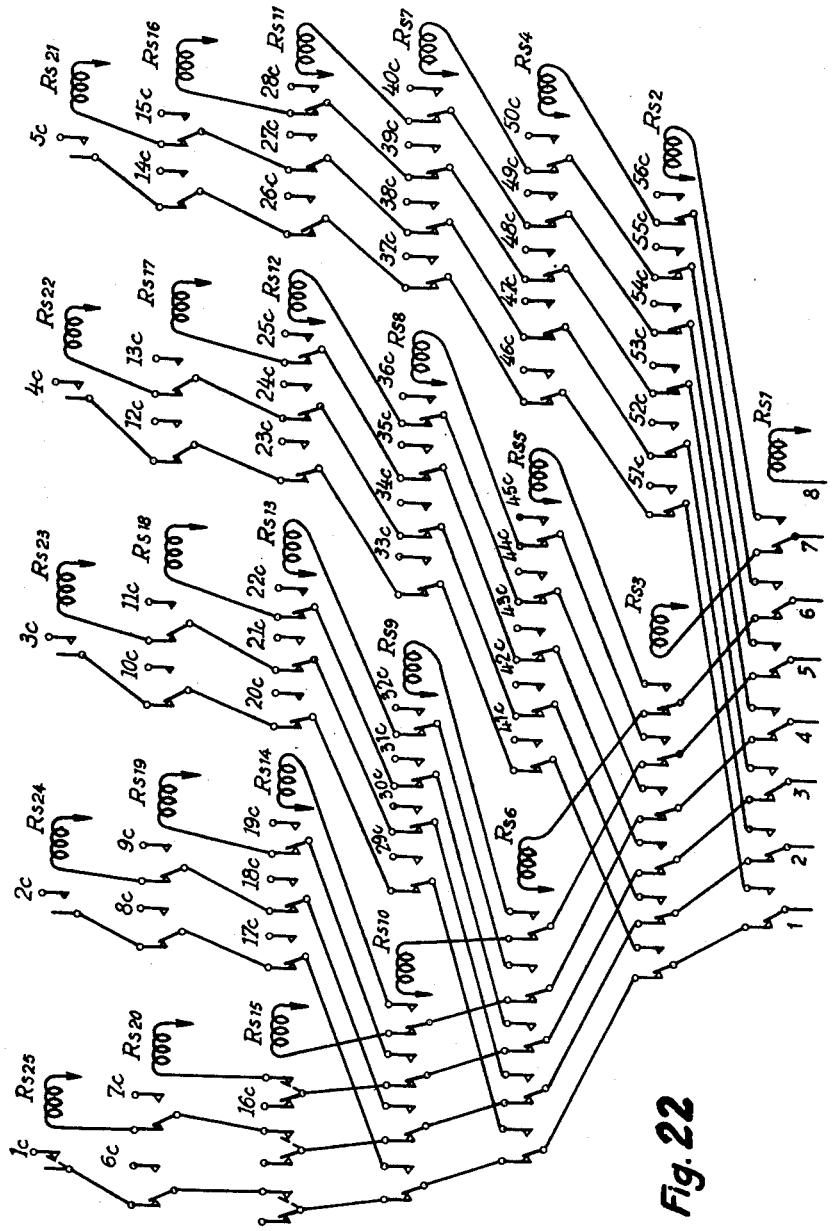

FIGURE 22 is the diagram of an assembly of relays pertaining to the instruction distributor RP of FIGURE 19.

Figure 2:
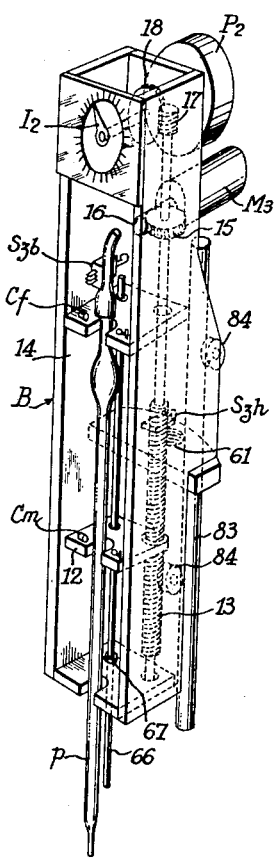
FIGURE 2 is a simplified perspective view of the pipette unit, showing the frame which supports the main pipette and various devices associated thereto.
Figure 23:
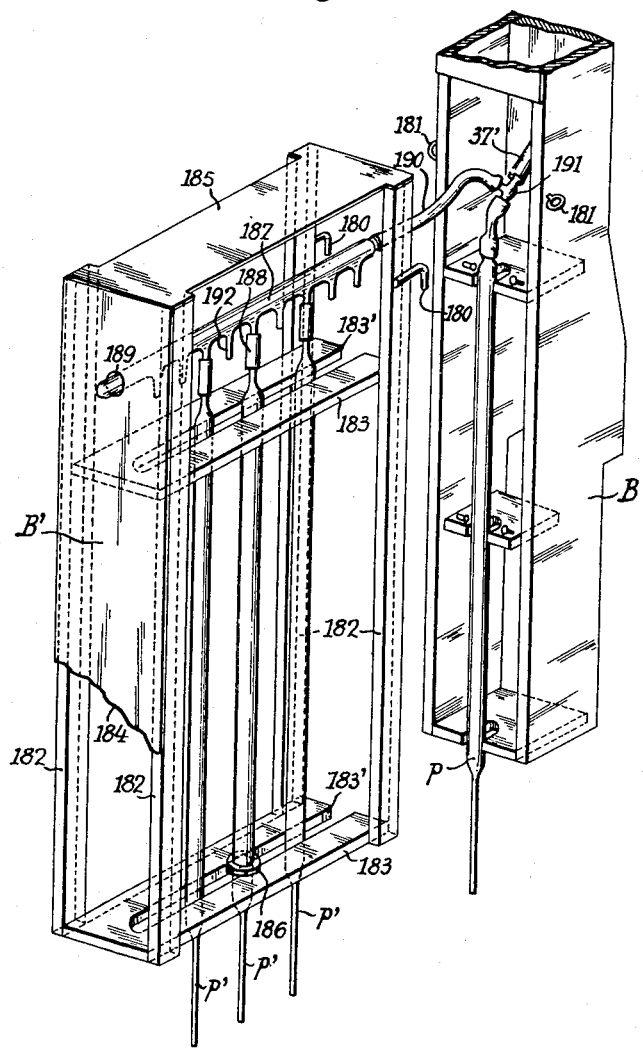

FIGURE 23 shows, in perspective the pipette unit B of the FIGURE 2, and attached thereto an associated unit with several additive pipettes.

Figure 24:
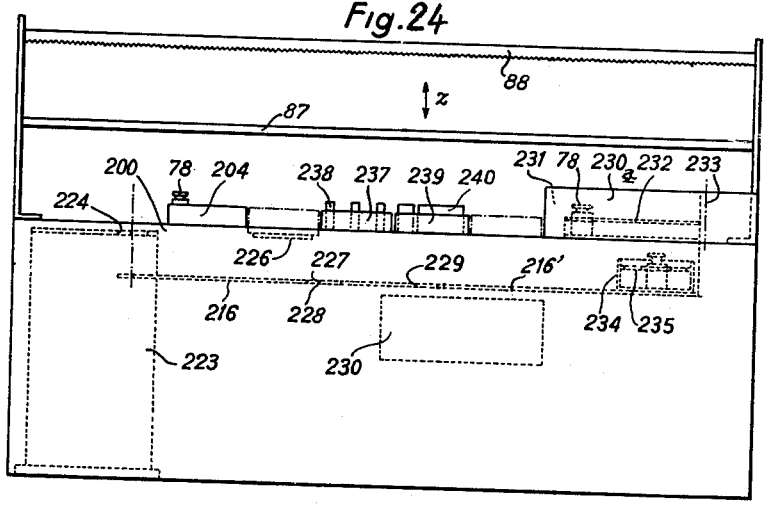
Figure 25:
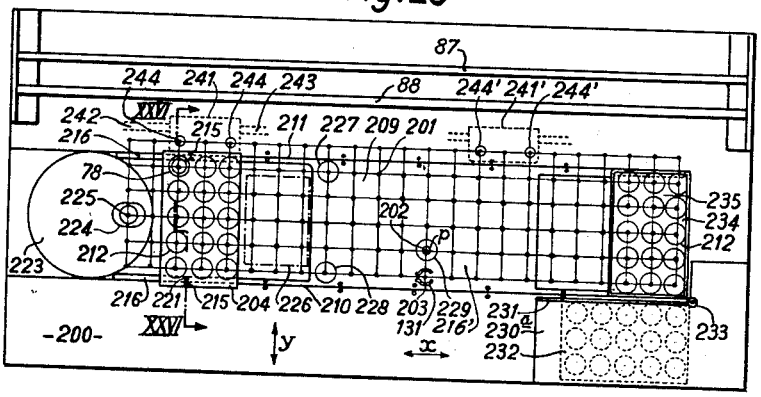

FIGURES 24 and 25 show in elevation and in plan view respectively a constructional form of a worktable.

FIGURE 26 is a section to a larger scale along the broken line XXVI—XXVI of FIGURE 25, FIGURE 27 corresponds to an end view in the direction of the arrow XXVII of the two racks illustrated in FIGURE 26, FIGURE 28 is a view in perspective of a rack adapted to be shifted by means of the grip, FIGURE 29 is a plan view of a rack containing receptacles in the form of tubes, and FIGURE 30 is a plan view of a rack containing receptacles in the form of parallelepipedic troughs.

Prior to the description, it will be noted, that, in the drawings, the conductors are shown to be ended by → and —X for indicating that these conductors are connected to the positive or negative terminals, respectively, of a D.C. source, a 24 volt source, for example.

It will be noted, on the other hand, that, in the following description, when there is called for positive voltage, or negative voltage, without any other qualification, it will indicate the positive or negative voltage of the above mentioned source. Moreover, when it is said that a relay or a trigger is in the represented state, it will imply that each one of its contacts is in the position shown in the corresponding figure; and that, when it is in the reverse or opposite state, it will be understood that each one of these contacts is in the position opposite to that represented in said figure.

It will be noted also that a relay or trigger contact will be designated by the letters and number characterizing the relay or trigger, followed with a letter assigned to that very contact; thus, if a contact $R_{3a}$ is mentioned, it is to be understood that the contact referred to is the contact $a$ of a relay $R_3$.

Figure 1:
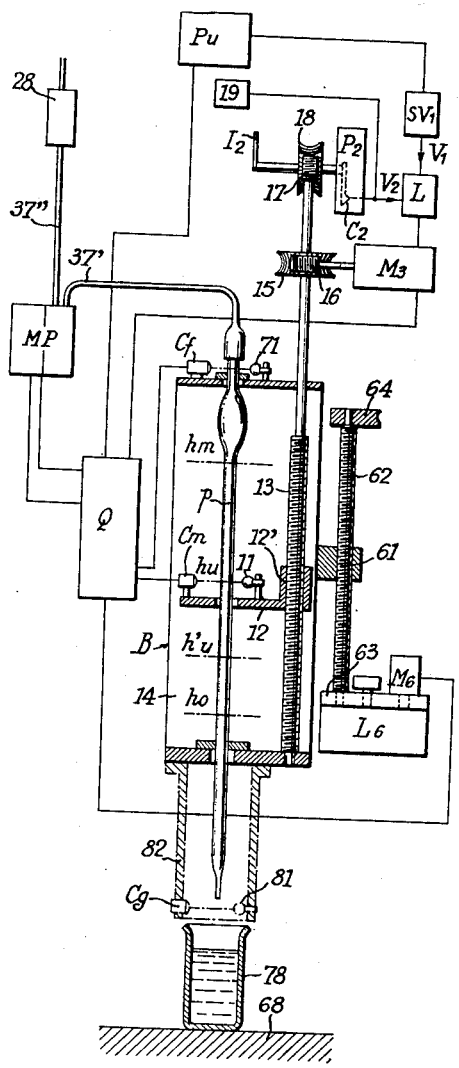
FIGURE 1 is a general diagrammatic view of automatic liquid transferring apparatus.

FIGURE 1 represents a liquid transferring automatic apparatus or pipette unit comprising; a main pipette $p$, a motor-diven pump MP for the passage of the liquid or gaseous fluid in the pipette, and a device for controlling the passage of the fluid through the pipette.

The latter device comprises an electric circuit Q controlling the operation of the pump MP, and in turn controlled by various devices among which is a device for detecting the level of the fluid in the pipette, and various safety or coordination devices, which will be discussed later on.

The level indication devict comprises a movable photoelectric cell $Cm$ mounted in front of a light source 11 on a movable support 12. The latter is provided with a threaded hole 12′ engaging a screw 13 mounted in a frame 14, which also supports pipette $p$. On an extension of screw 13, there is fixed a tangential wheel 15 engaging a worm 16, the rotation of which is controlled by an electric motor $M_3$. On the extension of screw 13, there is also fixed a worm 17 engaging a tangential wheel 18 controlling, on one hand, the pointer of an indicating apparatus $I_2$, and, on the other hand, the slider $C_2$ of a potentiometer $P_2$.

From the above, it appears that for any position of support 12 along screw 13, there corresponds a position of the pointer of indicating apparatus $I_2$, and also a position of the slider $C_2$ of potentiometer $P_2$. Consequently, for each position of the movable cell $Cm$ along pipette $p$, there corresponds a position of the pointer of the indicating apparatus $I_2$ and also a value of the voltage $V_2$ taken from the slider $C_2$ of potentiometer $P_2$; in other words, the location of cell $Cm$ is given by indicating apparatus $I_2$ and may also be indicated with more precision by an apparatus for measuring voltage $V_2$, which will be disposed preferentially in a centralizing assembly 19 wherein the result reading and recording devices will be grouped. Assembly 19 will also be disposed preferentially in the close proximity of a control assembly $Pu$ wherein the devices for controlling the operations to be performed will be grouped.

The run in both directions and the stop of motor $M_3$ are under the control of a device L, which compares voltage $V_2$ with an index voltage $V_1$ supplied by an adjustable voltage generator $SV_1$, and the value of which is determined by the position of a voltage selecting or adjusting apparatus. This apparatus may be, as represented in FIGURE 12, a graduated potentiometer $P_1$, to the slider $C_1$ of which is applied a potential $V_1$ depending upon its position along the basic resistance of potentiometer $P_1$. In FIGURE 12, there may be found again a potentiometer $P_2$ with its slider $C_2$, and the group of devices ensuring the transmission of the movement of motor $M_3$ to slider $C_2$ has been referenced 21. To slider $C_2$ is applied a potential $V_2$ depending upon its position along the basic resistance of potentiometer $P_2$.

The device comparing voltages $V_1$ and $V_2$, represented in FIGURE 12, comprises a double amplifying triode 22 and a differential relay RD. Voltages $V_1$ and $V_2$ are applied respectively to the grids of double triode 22, the anodes of which respectively feed to the two coils 23 and 24 of differential relay RD. The movable blade 26 of the latter is moved between contacts $a$ and $b$ under the action of the opposite magnetic fields produced by coils 23 and 24. When $V_1$ differs from $V_2$, blade 26 closes either contact $a$ or contact $b$, according whether $V_2$ is greater or smaller than $V_1$; when $V_1=V_2$, blade 26 is in balance between the two contacts $a$ and $b$.

Motor $M_3$ is fed under the control of a trigger $B_{12}$ which is switched to the represented state, or to the opposite state according whether the negative voltage is applied to terminal 27 or to terminal 27′. Contact $R_{5e}$ belongs to a relay $R_5$ represented in FIGURE 13, the function of which will be explained later on; now it will be seen that, when contact $B_{12b}′$ is closed and contact $B_{12a}$ is open, the double triode 22 is active and the rotation of motor $M_3$ is under the control of contacts $a$ and $b$ of relay RD. When contact $RD_a$ is closed (when $V_2>V_1$), motor $M_3$ is fed through its terminal D, and moves slider $C_2$ down; and therefore voltage $V_2$ decreases. When $RD_b$ is closed (when $V_2<V_1$), motor $M_3$ is fed through its terminal M and moves slider $C_2$ up; consequently, voltage $V_2$ increases. It appears therefore that, in all cases, the value of $V_2$ tends to be equalized to that of $V_1$, and it is only when $V_2=V_1$, that motor $M_3$ is stopped, the blade 26 of relay RD then being in balance between the contacts $a$ and $b$ of that relay. In other terms, the position of slider $C_2$, and voltage $V_2$ are both dependent on voltage $V_1$; and, as seen previously, to any position of slider $C_2$, there corresponds a position of movable cell $Cm$ along pipette $p$, the latter position being conditioned by voltage $V_1$. Consequently, the position of movable cell $Cm$ is determined by the index voltage $V_1$, and any variation $\Delta V_1$ of this voltage causes cell $Cm$ to move by $\Delta h$, said move being proportional to $V_{1\Delta}$, since voltage $V_2$ varies linearly with the movements of the slider $C_2$ on potentiometer $P_2$.

Instead of the simple graduated potentiometer $P_1$ of FIGURE 12, the apparatus represented in FIGURE 14 may be used as the voltage $V_1$ producing apparatus, $SV_1$ (FIGURE 1). In FIG. 14 potentiometer $P_1$ is divided into a number of basic resistances preferably with the same value connected to studs 0, 1, 2, 3, etc. of a plate $G_0$ of a two-plate step-by-step selector 30, this selector preferably being preferentially of the rotating type, as, for example those used in telephonic systems; studs 0′, 1′, 2′, 3′, etc. of the second plate $G′_0$ of selector 30 are connected respectively to the contacts $a$ of relays $R_{20}$, $R_{21}$, $R_{22}$, $R_{23}$, etc., the respective contacts $b$ of which are connected to the negative terminal of the supplying source. To plate $G_0$, there is associated a slider $C_0$ connected to the output terminal 32 of voltage $V_1$; and to plate $G′_0$ there is associated a slider $C′_0$ connected to the coil of relay $T_1$ which makes slider $C′_0$ and at the same time slider $C_0$ advance step-by-step. When a voltage 0 is supplied to relays $R_{20}$, $R_{21}$, $R_{22}$, etc., their contacts $a$ are closed and their contacts $b$ open, consequently, the circuit of relay $T_1$ is open, and sliders $C_0$ and $C′_0$ remain stationary. Each relay $R_{20}$, $R_{21}$, $R_{22}$, etc., may be energized by the application of the negative voltage to its respective control terminal 0, 1 and 2, etc. When to one of relays $R_{20}$, $R_{21}$, $R_{22}$ . . . etc., for example to relay $R_{22}$, is applied a voltage, the contact $a$ of that relay is open and its contact $b$ closes. The circuit of relay $T_1$ is then made by this closed contact $b$ and the contacts $a$ of the other relays which have kept closed; sliders $C_0$ and $C′_0$ are advanced step-by-step, until they reach studs 2 and 2′ of selector 30, which correspond to the relay $R_{22}$ which has been applied a voltage; at that moment, the circuit of relay $T_1$ is open, since the contact $a$ connected to stud 2′ is open; sliders $C_0$ and $C′_0$ therefore are maintained motionless opposite to studs 2 and 2′. The voltage $V_1$ applied to 32 therefore is that taken from stud 2; and its selection has been made by energizing relay $R_{22}$ corresponding to that stud.

When it is desired that voltage $V_1$ should be able to assume a very great number of values, the preceding system will be used to preselect plates instead of studs, i.e. instead of connecting studs, 0, 1, 2, 3 . . . of plate $G_0$ directly to potentiometer $P_1$, they will be connected, as shown in FIGURE 15, to sliders $c_0$, $c_1$, $c_2$ of plates such as $g_0$, $g_1$, $g_2$ . . . of another step-by-step selector $30'$, and the studs of these plates are connected to the successive basic resistances of potentiometer $P_1$. To plates $g_0$, $g_1$, $g_2$ . . . there will be associated a plate $g'_0$ with its sliders $c'_0$. The latter is connected to relay $T'_1$ which makes sliders $C'_0$, and, at the same time, all the sliders $c_0$, $c_1$, $c_2$ . . . of plates $g_0$, $g_1$, $g_2$ . . . advance step-by-step, from one stud to the next. The studs of plate $g'_0$ are connected respectively to the contacts $a$ of relays $R_{30}$, $R_{31}$, $R_{32}$ . . . the respective contacts $b$ of which are connected to the negative terminal of the supplying source. When relays $R_{30}$, $R_{31}$, $R_{32}$ . . . are not energized, their contacts $a$ are closed and their contacts $b$ open; consequently the circuit of relay $T'_1$ is open and sliders $C'_0$, $c_0$, $c_1$, $c_2$ . . . are not moved. When to one of the relays $R_{30}$, $R_{31}$, $R_{32}$ . . . is applied a voltage, to relay $R_{31}$ for example, its contact $a$ opens and its contact $b$ closes; the circuit of relay $T'_1$, is then closed by thus closed contact $b$, and the contacts $a$ of the other relays maintained closed; sliders $c'_0$, $c_0$, $c_1$, $c_2$ . . . are then advanced step-by-step, until they arrive at the studs which correspond to relay $R_{31}$, i.e. to all the studs 1 of plates $g'_0$, $g_0$, $g_1$, $g_2$ . . .; at that moment, the circuit of relay $T'_1$ is opened, since the contact $a$ connected to stud 1 of plate $g'_0$ is open; cursors $C'_0$, $c_0$, $c_1$, $c_2$ . . . keep motionless opposite to the studs 1 of plates $g'_0$, $g_0$, $g_1$, $g_2$ . . . therefore, it appears that, by energizing one of relays $R_{20}$, $R_{21}$, $R_{22}$ . . . (FIGURE 14 completed by FIGURE 15) one selects the corresponding plate $g_0$, $g_1$, $g_2$ . . . and that by energizing one of relays $R_{30}$, $R_{31}$, $R_{32}$ . . . one selects the stud row on these plates. Thus, if the negative voltage is applied to the terminal 2 of relay $R_{22}$, and to the terminal 1 of relay $R_{31}$, the selected plate will be $g_2$ and the selected studs will be studs 1; consequently, voltage $V_1$ which will be collected on terminal 32 will be that corresponding to tap 40 on potentiometer $P_1$.

The pump unit of FIGURE 1 is of a special type, an embodiment of which is represented in FIGURES 3 and 4. Pump $P_0$ of this group comprises a cylindrical body 35, provided with an inner annular groove 36, wherein there is located a tube 37 of a flexible elastic material such as rubber. This tube emerges from body 35 in $37'$ and $37''$, its portion $37'$ being connected to the upper part of pipette $p$ (see FIGURE 1) and its portion $37''$ generally communicates with the atmosphere. A shaft 38 coaxial with body 35, supports a yoke 39 itself supporting a roller 41 with a profile corresponding to that of groove 36, so that tube 37 is compressed between roller 41 and groove 36, and that the compression of the tube prevents all fluid communication between the two hose portions on either side of the compression zone. Under these conditions, the fluid, generally air, existing in the tube follows the movement of roller 41, and in portion $37'$, there occurs either a delivery, if shaft 38 rotates according to arrow $f$, or a suction if shaft 38 is rotated in the opposite direction. To have tube 37 well compressed by roller 41, the latter is preferably mounted on yoke 39 by another yoke 40 radially guided in the latter and subjected to the action of a spring located in the body of yoke 39; this spring is mounted so as to push yoke 40 radially outwards, and consequently it constantly causes roller 41 to resiliently press against tube 37.

Pump $P_0$ is actuated by means of two motors $M_1$ and $M'_1$, through a transmission comprising a gear differential. Motor $M_1$ drives the planet wheel 42 of the differential through gears 43 and 44, worm 46 and worm wheel 47. Motor $M'_1$ drives planet wheel 48 through worm 49 and worm wheel 50. Planet wheels 42 and 48 are engaged by pinions 52 and 53 mounted on an intermediate unit 54 connected to the shaft 38 of the pump. Motors $M_1$ and $M'_1$ are able to rotate in both directions, and there will be four rotation speeds in each direction available for shaft 38. For example, if it is supposed that motors $M_1$ and $M'_1$, rotate at the same speed, and that the gear ratio existing between motor $M_1$ and the intermediate unit 54 is three times as great as that existing between motor $M'_1$ and this unit, shaft 38 will be able to rotate at four different speeds, in respective ratios of 1, 2, 3, 4. Thus, if motor $M_1$ rotating by itself imparts a speed of one turn per second to shaft 38, motor $M'_1$ rotating alone will rotate shaft 38 at a speed of three turns per second, if motors $M'_1$ and $M_1$ are rotating simultaneously shaft 38 will be driven at a speed of two or four turns per second, according whether the respective speeds of the motor are added or subtracted. Therefore, it appears that the arrangement shown in FIGURE 3 enables shaft 38 to be driven at four speeds in each direction and therefore to give pump $P_0$ four delivery speeds and four suction speeds.

At the end of shaft 38 there is provided a worm 56 engaging a worm wheel 57 which drives a cam 58. The latter is designed to strike in one direction against safety contact $S_{4a}$ and in the other against safety contact $S_{4b}$. These contacts are normally open, and are only closed under the action of cam 58, which thus controls, through electrical circuits which will be seen later on, the operation of pump $P_0$.

Frame 14 (FIGURE 1) and the various devices it supports make an assembly B which will be designated as the pipette unit or block. This unit is arranged and mounted so as to be movable vertically, and, to this purpose, it comprises a nut 61 engaging a vertical screw 62. The latter is supported by cross-bars 63 and 64 which will be assumed fixed at present, but which, generally, are integral with a movable carriage which will be subsequently described with reference to FIGURE 10. Screw 62 is connected to a motor $M_6$ through a transmission represented by diagrammatic block $L_6$. Under these conditions, the rotation of motor $M_6$ in one direction or in the other causes up or down movement of pipette unit B. These up and down movements are limited by run end contacts $S_{zh}$, and $S_{zb}$ which may be seen in FIGURE 2, wherein the main devices described with reference to FIGURE 1 are shown with the same references. In FIGURE 2 may be seen a rod 66 suspended by ring 67 fixed thereon. The lower end of rod 66 is designed to butt, during the down movement of pipette unit B, against the work table 68 (see FIGURE 1) or against a member supported by this table. Rod 66 is thereby stopped, whereas the pipette unit continues to move downwardly, which brings contact $S_{zb}$ to butt against the upper end of rod 66. The result is that this normally open contact is closed to operate electrical circuit Q, as will be seen later on. Similarly, normally open contact $S_{zh}$ is closed when, during the up move of pipette unit B, it butts against a fixed point, for example the lower end of a screw 69 fixed to th ecross arm 64 of the carriage, as seen in FIGURE 10.

The electrical circuit Q is also under the possible control of a fixed photoelectric cell $Cf$ (FIG. 1). The latter is disposed at the upper part of the pipette unit, opposite a light source 71 and it is put into service, instead of movable cell $Cm$ by a switching device to be seen later on.

FIGURE 13 represents an embodiment of the electrical circuit Q controlling the pump unit MP of FIGURE 1. FIGURE 13 also shows motors $M_1$ and $M'_1$ of that unit, safety contacts $S_{4a}$ and $S_{4b}$ which control the operation of the pump, motor $M_6$ controlling the vertical movement of the pipette unit, the run end contacts $S_{zh}$ and $S_{zb}$ of that movement, photoelectric cells $Cm$ and $Cf$. It additionally shows the following elements:

A trigger $B_1$ with five contacts $a$, $b$, $c$, $d$, $e$; this trigger is energized by contacts $S_{zh}$ and $S_{zb}$; contact $S_{zh}$, when closing, switches trigger $B_1$ to the represented state; the closure of contact $S_{zb}$ turns it to the opposite state.

A trigger $B_2$ with five contacts $a$, $b$, $c$, $d$, $e$; this trigger is picked up either by the closure of contact $S_{zh}$, or by the application of the negative voltage to terminal $71'$;

in the first case, trigger $B_2$ is switched to the represented state; in the second case, it is switched to the opposite state.

A trigger $B_3$, with six pairs of contacts $a$, $a'$, $b$, $b'$, $c$, $c'$, $d$, $d'$, $e$, $e'$ and $k$, $k'$; this trigger is picked up by the negative voltage being applied either to terminal 72 or to terminal 72'; in the first case trigger $B_3$ is switched to the represented state; in the second case, it is switched to the opposite state.

A trigger $B_4$ with two pairs of contacts $a$, $a'$, $b$, $b'$; this trigger is picked up by contacts $S_{4a}$ and $S_{4b}$; the closure of contacts $S_{4b}$ sets the trigger to the represented state; the closure of contact $S_{4a}$ brings it to the opposite state.

A trigger $B_5$ with a pair of contacts $a$ and $a'$, picked up by the negative voltage applied either to terminal 73 or to terminal 73'; in the first case, trigger $B_5$ is set to the represented state; in the second case, it is switched to the opposite state.

A trigger $B_7$ comprising a contact $a$ and energized either by a negative voltage applied to terminal 74' or by the closure of contact $S_{zh}$. In the first case, a contact $a$ is closed; in the second case, it is opened.

A trigger $B_8$ with two contacts $a$ and $b$; this trigger is picked up either by contact $S_{4b}$, the closure of which brings trigger $B_8$ to the represented state, or by a negative voltage applied to terminal 76'; in the latter case, trigger $B_8$ is switched to the reverse state.

A step by step selector $T_3$, preferentially of the type used in telephonic systems; this selector comprises a relay $T'_3$, three sliders $c_a$, $c_b$, $c_c$, and three plates $g_a$, $g_b$, $g_c$, each of which comprises twelve studs 0, 1, 2, 3 . . . 11; these studs and sliders are connected as indicated in FIGURE 13; the step by step advance of the sliders results from the energization of the relay $T'_3$ of the selector.

A relay $R_3$ with two pairs of contacts $a$, $a'$ and $b$, $b'$; this relay is picked up by the energization of its coil. When it is picked up, it is switched to the opposite state. When it is de-energized, it is switched back to the represented state.

A relay $R'_3$ with one contact $a$. The latter is open when the relay is de-energized; and it is closed when the relay is energized by virtue of a voltage being applied to its coil.

A relay $R_5$ with five contacts $a$, $b$, $c$, $d$, $e$. This relay is picked up and switched to the reverse state, when contact $B_{3d}'$ is closed by the lighting of one of the photoelectric cells $Cm$ or $Cf$ as determined by trigger $B_5$. Variable resistance $r$ is used to adjust the lighting threshold for the energization of relay $F_5$. The latter is de-energized and set to the represented state when said lighting ceases or when contact $B_{3d}$ opens.

A relay $R_6$ with one contact $a$. The latter is closed when the relay is de-energized, and it opens when the relay is actuated by the application of a negative voltage to terminal 77'.

The apparatus which has just been described may easily perform various operations some of which will now be considered.

I. *Removing of a Predetermined Volume of Liquid*

It will be first supposed that pipette $p$ (FIGURE 1) has been brought above a container 78 from which the liquid is to be removed, and that pipette unit B is in the upper position, which has made contact $S_{zh}$ close and therefore, triggers $B_1$, $B_2$ and $B_7$ to be set to the represented state (FIGURE 13).

The controls to be performed are as follows:

(1) Application of a negative voltage to terminal 27 of trigger $B_{12}$ (FIGURE 12), and consequently opening of contact $B_{12a}$ and closure of contact $B_{12b'}$. The operation of motor $M_3$ is then under the control of relay RD.

(2) Positionment of slider $C_1$ (FIGURE 12) so that it may take, from potentiometer $P_1$, a voltage $V_1$, the value $V_{1u}$ of which corresponds to the liquid volume $w_u$ to be removed. To this effect, it will be noted that cell $Cm$ cannot move below a minimum level $h_0$ (see FIGURE 1); the volume of the liquid in the pipette, up to any level $h_u$ is therefore equal to the sum of volume $v_u$, comprised between levels $h_u$ and $h_0$, and of volume $v_0$ comprised between level $h_0$ and the lower end of the pipette. On the other hand, it has been seen previously that, to any variation $V_1$ of voltage $V_1$, there corresponds a move $\Delta h$ of cell $Cm$, said move being proportional to $\Delta V_1$; therefore it may be said that: $V_1 = k'h$ ($k'$ being a constant). If the value $V_1 = 0$ is made to correspond with level $h_0$ of $Cm$ and if level $h_u$ is measured from $h_0$, the result will be:

$$V_{1u} = k'h_u \quad (1)$$

If it is assumed that the diameter of the pipete is constant between levels $h_0$ and $h_u$, the result will be:

$$V_{1u} = kv_u \quad (2)$$

($k$ being a constant).

Value $V_{1u}$, therefore corresponds to a volume $v_u$ ranging between levels $h_u$ and $h_0$, therefore to a volume to be removed $w_u = v_u + v_0$, $v_0$ being a constant for the pipette used.

In the apparatus comprising the set-up of FIGURE 14, value $v_{1u}$ will be selected by the negative voltage to the terminal 0, 1, 2 . . . of the assembly of relays $R_{20}$, $R_{21}$, $R_{22}$, which corresponds to that value. In the apparatus comprising the circuitry of combined FIGURES 14 and 15, the selection will be made by applying the negative voltage on the one hand to one of the terminals 0, 1, 2 . . . of the assembly of relays $R_{20}$, $R_{21}$, $R_{22}$, and on the other hand, to one of the terminals 1, 0, 2 . . . of the assembly of relays $R_{30}$, $R_{31}$, $R_{32}$ . . . ; the two terminals to which the negative voltage is thus applied correspond to the value $V_{1u}$ to be selected.

For the reasons explained previously with respect to the operation of the set-up of FIGURE 12, motor $M_3$ brings cell $Cm$ at the level $h_u$ corresponding to the value $V_{1u}$ of voltage $V_1$.

(3) Application of the negative voltage to terminal 73 (FIGURE 13); contact $B_{5a}$ closes, and cell $Cm$ is kept in circuit. The latter is illuminated by source 11, since the pipette is empty and the cell is actuated so that relay $R_3$ is set to the opposite state.

(4) Application of the negative voltage to terminal 74' of trigger $B_7$. Contact $B_{7a}$ is closed, and the positive voltage is applied to the terminal + of motor $M_6$, which, on the other hand, through closed contacts $R_{3b}$ and $B_{1a}$, receives the negative voltage on its other terminal D. Motor $M_6$ moves the pipette unit down until the contact $S_{zb}$ is open so that trigger $B_1$ is switched to the reverse state. This results in an opening of contact $B_{1a}$ and in stopping of motor $M_6$. The pipette unit is stopped in the lower position, and the pipette dips into the liquid in vessel 78. On the other hand a negative voltage is applied through closed contacts $B_{1c}$, $B_{2c}$, $R_{5c}$, to the terminal A of motor $M_1$. The latter imparts a small speed to the pump and causes a suction at a small speed in the pipette. The liquid of the container therefore is drawn into the pipette up to the level $h_u$, where it interrupts or changes the lighting of cell $Cm$, either because it is opaque enough, or because the meniscus it forms at its upper level in the pipette acts as a lens to cause the light beam from source 11, to be diverted from striking cell $Cm$. The interruption or change of the lighting causes relay $R_5$ to be switched to the represented state, and due to consecutive opening of contact $R_{5c}$ it stops motor $M_1$, and suction by the pipette. The latter is thus filled up to level $h_u$, i.e. it contains, as described in paragraph 2 above, a volume of liquid equal to volume $w_u$ to be removed.

On the other hand, the setting to the represented state of relay $R_5$ has caused negative voltage to be sent to terminal M of motor $M_6$ through closed contacts $B_{1b}$, $B_{2b}$, $B_{3a}$ and $B_{3c}$. The pipette unit is thus moved up to close contact $S_{zh}$; and this closure brings triggers $B_1$ and $B_7$ back to the represented state, and therefore causes motor $M_6$ to stop. Everything is then as it was initially, with the exception that pipette $p$ now contains a volume $w_u$ of liquid.

II. *Discharge of a Predetermined Volume of Liquid*

It will be assumed, for purposes of explanation, that this distribution is to be made after the removing indicated above, the vessel 78 being replaced by another. The controls to be performed will then be as follows:

(1) Positionment of slider $C_1$ (FIGURE 12), as seen in the second paragraph of the chapter; I concerning the removing but now voltage $V_1$ will be given a value $V'_{1u}$ depending upon volume $w'_u$ to be distributed, this volume being measured from level $h_u$. The liquid will have to go down the pipette to a level $h'_u$ (FIGURE 1) such as the volume comprised between levels $h_u$ and $h'_u$ is equal to $w'_u$. The value $V'_{1u}$ will therefore be that corresponding to level $h'_u$, i.e. to a volume $v'_u$ measured from $h_0$. As the above relation (2) is general:

$$V'_{1u}=k(v_u-w'_u)=V_{1u}-kw'_u \qquad (3)$$

Since cell $Cm$, after the previous removing, is kept in circuit, and for the reasons explained above with reference to the operation of the set-up, in FIGURE 12, motor $M_3$ brings cell $Cm$ to level $h'_u$ corresponding to the new value $V'_{1u}$ of voltage $V_1$.

(2) Application of a negative voltage to terminal 71', switches trigger $B_2$ to the opposite state. Motor $M_6$ then receives at its positive terminal positive voltage through closed contact $B_{2a}$, and on its terminal D, a negative voltage, through closed contacts $R_{3b}$ and $B_{1a}$. The pipette unit goes down to cause the closure of $S_{zb}$. At the same time, the pipette enters the vessel and into which the liquid is to be discharged.

It will be noted, in this respect, that during the discharge the pipette preferably is not dipped into the liquid in the vessel. It will be therefore arranged for contact $S_{zb}$ be closed before this happens, which may be obtained by having rod 66 butt against the upper edge of a projection of the vessel, or against a suitable stop of suitable height provided on the table beside the vessel. Alternatively contact $S_{zb}$ may be replaced or supplemented by contact $S'_{zb}$ which will be described later on, and which will close at a suitable level of the pipette unit, this low level being adjustable and predetermined by electrical contacts.

The closure of contact $S_{zb}$ switches trigger $B_1$ to the opposite state, which results in applying through closed contacts $B_{1d}$, $B_{2d}$, $R_{5d}$ and $R_{6a}$ the negative voltage to terminal R of motor $M_1$. The latter is now driven in a direction causing delivery from the pipette. The distribution from the pipette is made, the liquid going down the pipette to level $h'_u$. At that moment, cell $Cm$ is illuminated and relay $R_5$ is switched to the opposite state; this results in opening contact $R_{5d}$ and consequently in stopping motor $M_1$ and the delivery from the pipette. The latter is then filled to level $h'_u$ and therefore, the pipette has distributed a liquid volume $w'_u$.

On the other hand, the switching to the reverse state of relay $R_5$ has caused the closure of contact $R_{5b}$, and therefore, a negative voltage to be sent to terminal M of motor $M_6$, through closed contacts $B_{1b}$, $B_{3c}$, $B_{8b}$, $B_{2e}$ and $B_{3c}$. The pipette unit therefore moves up to cause contact $S_{zh}$ to close, and this closure switches triggers $B_1$ and $B_2$ to the represented state. Contact $B_{2a}$ is therefore open, and motor $M_6$ stops, thus leaving the pipette in its most raised position.

III. *Automatic Washing and Drying of the Pipette*

It will be first supposed that the pipette has been brought above a washing container or vessel full of water, or a washing liquid, and that the pipette unit is in its highest position, which has caused the closure of contact $S_{zh}$, and therefore triggers $B_1$, $B_2$ and $B_7$ to be switched to the represented state.

There is but one control to be performed, the others following automatically however, to avoid unnecessary repetitions the whole automatic washing and drying operation will be explained below in numerical sequence:

(1) Application of the negative voltage to terminal 72' (FIGURE 13), which switches trigger $B_3$ to the reverse state. The closure of contact $B_{3a}$ causes the application of the positive voltage to a terminal + of motor $M_6$, whereas the negative voltage is applied to terminal D of motor $M_6$ through closed contacts $R_{3b}$ and $B_{1a}$. Consequently, motor $M_6$ moves the pipette unit down, and the pipette dips into the liquid in washing vessel. On the other hand, contact $S_{zb}$ closes and brings trigger $B_1$ to the opposite state, which results in opening contact $B_{1a}$, and stopping motor $M_6$, it also results in closing contact $B_{1e}$ causing a negative voltage to be applied to terminal A' of motor $M'_1$ through closed contacts $B_{4a}'$, $B_{1e}$, and $B_{3b}$. Motor $M'_1$ i.e. the one imparting a great speed to the pump causes a strong suction to be applied in the pipette. The washing liquid therefore enters the pipette rapidly.

It has been seen, with respect to FIGURE 3, that contacts $S_{4a}$ and $S_{4b}$ may be closed by cam 58. They are used to limit the suction and delivery of the pump. The worm 56—worm wheel 57, on one hand, and the position of contacts $S_{4a}$ and $S_{4b}$, on the other hand, are arranged to produce this effect. It is on the other hand provided to make the position of said contacts adjustable, in order that the end of the suction or that of the delivery may be adjusted or modified.

(2) When the suction has caused the filling of the pipette and even overflow, if desired, according to the maximum suction limit fixed by the stop bearing of cam 58 on contact $S_{4a}$, this contact closes; and it results in the application, through closed contacts $S_{4a}$, $B_{3k}$, of the negative voltage to the coil of the relay $T'_3$ of step by step selector $T_3$. On plates $g_a$, $g_b$, $g_c$, corresponding sliders $c_a$, $c_b$, $c_c$, of that selector pass from the studs of row 0 to those of row 1. On the other hand, the closure of contact $S_{4a}$ causes trigger $B_4$ to be switched to the opposite state, therefore contact $B_{4a}$ closes, and consequently a negative voltage is applied to the terminal R' of motor $M'_1$. The pump then delivers at a great speed and the pipette is completely and rapidly emptied.

(3) When the pipette is emptied, cam 58 closes contact $S_{4b}$; trigger $B_4$ is set to the represented state, and contact $B_{4a}$ closes. The negative voltage is then applied through closed contacts $B_{4a}'$, $B_{1e}$ and $B_{3b}$, to terminal A' of motor $M'_1$; the pump is then driven at a high speed, and the pipette is subjected to strong suction. When the pipette is filled, the conditions are repeated as before and the same operations take place. Therefore, the pipette is emptied and the sliders of selector $T_3$ are advanced from the studs of row 1 to those of row 2.

(4), (5), (6), (7) Repetition of the operations indicated in paragraph 3; then the pipette is emptied with, each time, and advance by one step of the sliders of selector $T_3$. So that, at the end of (7) the sliders reach the studs of row 6.

(8) Through sliders $c_a$ and the stud of order 6 of plate $g_a$, a negative voltage is applied to the coil of relay $R_3$. The latter is actuated and switched to the opposite state. Contacts $R_{3a}$ and $R_{3b}$ are then closed. When at the end of the above step 7, the pipette is emptied, contact $S_{4b}$ closes; trigger $B_4$ is set to the represented state. The negative voltage is applied through closed contacts $B_{4b}'$ and $R_{3a}$, to the terminal M of motor $M_6$. The pipette moves up, and, in doing so, it sucks, since the negative voltage is applied on the other hand to the terminal A' of motor $M'_1$, through closed contact $B_{4a}'$, slider $c_b$, the stud 6 of plate $g_b$ and contact $B_{3b}$ which is then closed. When the pipette reaches its highest position, contact $S_{zh}$ closes and brings trigger $B_1$ back to the represented state.

(9) At the end of the suction by the pipette contact $S_{4a}$ closes. Consequently, on the trigger $B_4$ is switched to the reverse state, and therefore the pipette is caused to deliver by application of the negative voltage to terminal R' of motor $M'_1$. Therefore, on the other hand, negative voltage is applied through closed contacts $B_{3k}$ to the relay $T'_3$ of selector $T_3$. The cursors of that selector pass then from the studs of the 6th order to the studs 7 order. At the end of the delivery, contact $S_{4b}$ closes and switches trigger $B_4$ to the represented state; the negative voltage is sent to the terminal A' of motor $M'_1$, through closed contact $B'_{4a}$, slider $C_b$, the stud 7 of plate $g_b$ and closed contact $B_{3b}$. The pipette therefore sucks air. On the other hand, it is maintained at its upper position, since contact $R_{3b}$ is now opened by the actuation of relay $R_3$, the coil of which is fed by the stud 7 of the plate $g_a$.

(10), (11) Repetition of the 9th step, i.e. delivery, then air suction, and an advance by one step of the sliders of selector $T_3$ are twice repeated so that by the end of step 11, these sliders are set on the studs 9, whereas the pipette is sucking in the upper position.

(12) By the end of the suction, contact $S_{4a}$ closes, therefore, on one hand, trigger $B_4$ is switched to the reverse state, and the pipette starts delivering; on the other hand, negative voltage is applied, through closed contacts $B_{3k}$, to relay $T'_3$ of selector $T_3$. The sliders of that selector then change from the studs 9 to studs 10. At the end of the delivery, contact $S_{4b}$ closes and sets trigger $B_4'$ to the represented state. Then the negative voltage is sent, through closed contact $B_{4a}$, slider $c_b$, and the stud 10 of plate $g_b$, to the terminal 72 of trigger $B_3$. The latter is switched back to the represented state; contact $B_{3c}'$ is then closed, and the negative voltage it receives from slider $c_c$, which has been set on the stud 10 of plate $g_c$ of selector $T_3$, is applied to the coil of relay $R'_3$. Contact $R'_{3a}$ closes and sends the negative voltage to the coil of relay $T'_3$. The latter is actuated, and the sliders of selector $T_3$ are set onto the studs 11 of that selector. Therefore the coil of relay $R_3$ is de-energized and this relay comes back to the represented state. On the other hand, the negative voltage is applied to the studs 11 of plate $g_c$, slider $c_c$ and closed contact $B_{3c}'$, to coil of relay $R'_3$. Contact $R'_{3a}$ closes and applies the negative voltage to the coil of relay $T'_3$. The latter is energized and the sliders of selector $T_3$ are advanced by one step, which, since the selector is a rotative one, brings them back to stud 0. The whole assembly is then back to the initial state, whereas the pipette is washed, dried and ready to be used again.

It will be noted that the number of the suction-delivery steps for the washing liquid or drying air depends upon the number of the studs on the plates of selector $T_3$; and with a sufficient number of studs, the washing and drying of the pipette may be made as many times as desired to get a satisfying result.

On the other hand, an air heater such as for example an electrical heater 28 (FIGURE 1) may be mounted on pipe 37" of a pump and put in use at the suitable time. There may also be provided apparatus to dehydrate the air brought to pipe 37" in order to accelerate the drying of the pipette. It will also be noted that it is possible to use, instead of air, a gas or fluid, such as ether or alcohol, having characteristics convenient to rinsing.

IV. *Indication of a Volume of Liquid Delivered by the Pipette*

For a better understanding, it will be assumed that the dosage is such that its last step is manifested by a change in the color of a colored solution contained in a vessel disposed under the pipette; that the dosage is performed by measuring the quantity of reagent which is to be distributed by the pipette in the solution to bring the latter to a predetermined colored state; that the moment when the solution reaches that state is determined by a photocolorimeter to compare the colored state of the solution contained in said vessel with the colored state of a sample in a state corresponding to the predetermined colored state; and that at the moment when the solution reaches the predetermined color state, the photocolorimeter applies a negative voltage to the terminal 77' of relay $R_6$ (FIGURE 13).

It will be further assumed that trigger $B_5$ is in the represented state, that trigger $B_1$ is in the reverse state, that cell $Cm$ and the liquid in the pipette are initially at level $h_u$ (FIGURE 1), therefore cell $Cm$ is lighted and relay $R_5$ in the reverse state.

The operations to be performed are the following:

(1) Application of the negative voltage to terminal 76'; consequently, setting of trigger $B_8$ to the reverse state.

(2) Application of the negative voltage to terminal 71'; thus trigger $B_2$ is switched to the opposite state. The negative voltage is applied through closed contacts $B_{1d}$, $B_{2d}$, $B_{8a}$ and $R_{6a}$ to the terminal R of motor $M_1$. The pump delivers at a low speed and the pipette distributes an increasing quantity of liquid in the vessel. When the solution contained in the latter reaches the predetermined colored state, the photocolorimeter, mentioned above, applies the negative voltage to relay $R_6$. Contact $R_{6a}$ opens and interrupts the voltage of motor $M_1$; therefore the pipette stops delivering. At that moment, the liquid therein is at level $h'_u$.

(3) Application of the negative voltage to terminal 27' of trigger $B_{12}$ (FIGURE 12). The latter is switched to the reverse state; therefore, on one hand, double triode 22 is turned off and, on the other hand, the negative voltage is applied through closed contacts $B_{12a}$ and $R_{5e}$ to terminal D of motor $M_3$. Cell $Cm$ moves down to level $h'_u$ of the liquid. At the instant when it reaches that level, it is no longer lighted, and relay $R_5$ is switched to the represented state. Contact $R_{5e}$ therefore opens and interrupts the supply for motor $M_3$, which stops. Cell $Cm$ therefore stops at the $h'_u$ level.

It has been seen that the position of slider $C_2$ (FIGURES 1 and 12) of potentiometer $P_2$ is conditioned by that of cell $Cm$; consequently, the measure of voltage $V_2$ taken by slider $C_2$ provides an indication of the corresponding position of cell $Cm$. Since, on the other hand, for each value of $V_1$ there corresponds a value $V_2$ equal to $V_1$, relation (3) which has been established in point (1) of chapter II concerning the discharge may be written:

$$V'_{2u} = V_{2u} - kw'_u \qquad (4)$$

wherein $w'_u$ is the pipette volume comprised between the two levels $h_u$ and $h'_u$, and wherein $V_{2u}$ and $V'_{2u}$ are the values of voltage $V_2$, which correspond respectively to these two levels.

From (4), there is obtained the relationship that $$w'_u = \frac{1}{k}(V_{2u} - V'_{2u}) \qquad (4')$$

which shows that the reading of the voltage $V_2$ measuring apparatus 19 provides an indication of the reagent volume $w'_u$ which has brought to the predetermined colored state the solution to be analyzed in the vessel. It will be noted that indicating apparatus $I_2$ (FIGURES 1 and 2) may give also a similar indication, with less precision however.

The dosage or analysis, by measuring a volume of liquid delivered by the pipette may be performed with apparatus other than a photocolorimeter. It will suffice that the comparing apparatus used to determine a reference state should apply a negative voltage, at the instant when the solution to be analyzed arrives in that state, to terminal 77' (FIGURE 13). It will be seen, for example, that when it is desired to measure the rate of a radio-active substance in a solution distributed by the pipette; this measure may be made by means of comparing apparatus which comprises a scintillator or spinthariscope connected to a scintillation counter, on which the number of scintillations per time unit of a sample solution will have been predisplayed, and which will be set so as to send the negative voltage to terminal 77′, when the number of scintillations recorded by said counter during the dosage or analysis will correspond to the pre-displayed number.

Other operations than those hereinbefore described may be executed by the apparatus in accordance with the invention. It can be mentioned, in particular, on one hand the entire pipette emptying out operation, which will be performed by applying the negative voltage to terminal 76′; and, on the other hand, the entire pipette filling up operation, during which operation a negative voltage is applied to terminal 73′ of trigger $B_5$, in order to energize, instead of movable photoelectric cell $Cm$, fixed cell $Cf$, the function of which will be to stop the pipette sucking when level of the liquid reaches the height of this cell.

The invention further contemplates the use of a so-called dropping tube cell $Cg$ (FIGURE 1) arranged in the lower part of the pipette, so that the drops delivered by the latter interrupt the lighting of cell $Cg$. The latter as well as its light source 81, is carried by a support 82 fixed to frame 14 of the pipette unit. The securing of support 82 is preferentially such that support 82 may be easily mounted or removed. Cell $Cg$ and source 81 are such as to provide a sufficient variation in the cell response when the beam from the source is interrupted by a drop. The fall of the successive drops therefore produces a succession of electric pulses in the cell circuit. These pulses are applied to a pulse counter provided to stop the pump when a predetermined number of pulses adjustable at the operator's will, is recorded by the counter. The pump will be arranged so that the pipette has a delivery low enough for the delivered drops to be neatly separated. This is easy with the pump unit, FIGURE 3. It will suffice to provide a suitable transmission, and to rotate simultaneously the two motors $M_1$ and $M'_1$ in directions such as they counteract each other effects. The simultaneous control of motors $M_1$ and $M'_1$ may for example be performed by means of a trigger $B_6$ (see FIGURE 16) with two pairs of contacts $a$, $a'$, and $b$, $b'$. This trigger is in the state represented or in the opposite state according to whether a negative voltage is applied to terminal 86 or to terminal 86′. By applying the negative voltage to terminal 86′, the two motors $M_1$ and $M'_1$ are started in rotation and the pipette delivers drop by drop, under the control of the dropping tube cell $Cg$, and of the pulse counter mentioned above. When the number pulses predisplayed on the counter is reached, the latter applies a negative voltage to terminal 86, and motors $M_1$ and $M'_1$ are stopped. Therefore, the pipette stops delivering drop by drop after the latter has distributed a number of drops equal to the number of pulses predisplayed on the counter.

According to another embodiment of the invention, on the pipette unit there may be mounted several calibrated pipettes, nine for example, identical to pipette $p$ and disposed parallel thereto and connected through their upper part to the pipe 37′ of the pump. Pipette $p$ and its level and control devices may then be used as an index for the other pipettes, and it will then be possible to perform simultaneously a number of identical operations. It is also to be noted that any move of the pipette unit causes a simultaneous identical move of all the pipettes supported by this unit, and on the other hand that, all other values being equal, the level of the liquid in all the pipettes only depends upon the pressure in pipe 37′ so that the level variations occurring in pipette $p$ also occur in the other pipettes, which is equivalent to saying that all pipettes perform at the same time the same removings and the same discharges of liquid from corresponding vessels.

An example of an embodiment of the preceding is represented in FIGURE 23, wherein there is seen the pipette unit of FIGURE 2, as well as the main pipette $p$. Also shown is an associated unit B′ adapted for being fixed to the front part of pipette unit B; for example, by means of hooks 180 which will be engaged in rings 181 carried by unit B.

The associated unit B′ comprises four uprights 182, two transverse plates 183, a front plate 184 and a top plate 185. Plates 183 are respectively provided with slots 183′ through which engage auxiliary pipettes $p'$ calibrated and identical to main pipette $p$.

Each pipette $p'$ is maintained vertical, for example by means of a rubber disc 186, around the body of the pipette; pipettes $p'$ on the other hand are connected to a pipe 187, by portions of rubber tube such as 188. Pipe 187 presents, on one hand, a closed end which is engaged in a hole 189 provided in the front plate 184; and on the other hand, an open end which is connected through a flexible tube 190 to a T-joint 191 inserted in duct 37′ connecting main pipette $p$ to the pump mentioned above.

In FIGURE 23, for a better understanding, there have been represented only three pipettes $p'$. Actually, there are as many pipettes $p'$ as tubing 187 connecting points such as 192. In the considered example, there will be nine auxiliary pipettes $p'$ which will perform on one hand the same movements as the main pipette $p$, because they are dependent upon the same unit B, and on the other hand, the same removings and the same discharges as said pipette $p$, because the level variations in all the pipettes are controlled simultaneously by variations in the pressure in duct 37′ which is connected to the pump, said pump causing the pressure variations.

There will now be described with reference to FIGURES 5 to 11 a device for the automatic displacement of the pipette and of the receptacles for use therewith in accordance with three rectangular coordinates. In FIGURE 5 will be seen the pipette unit B, which is supported by a carriage F, which is mounted on a transverse carriage T. The latter is in turn supported by two rails 87 and 88 forming part of a fixed frame (not shown). The front carriage F also supports a grip unit G. The double arrows $x$, $y$, $z$, and $z'$ indicate the various directions of movement of the carriage T, of the carriage F, of the pipette unit B and of the grip unit G. The planes $P_1$ and $P_2$ represent two working planes of a table specially designed to support the receptacle and the functional assemblies such as the photocolorimeter, which will hereinafter be referred to.

FIGURES 6 to 8 show the arrangement allowing transverse movements of carriage T. The latter supports, on one hand, two rollers 89 and 89′ in contact with the lower rail 87 which is of the shape of a cylindrical rod, and, on the other hand, four rollers 91, 91′, 92 and 92′, which contact the upper rail which has a rectangular section. The two rollers 91 and 91′ rest on the upper surface 88′ of rail 88, and the two rollers 92 and 92′ contact the back surface 88″ thereof.

The lower surface of rail 88 is formed as a rack 90 which engages gear 94 integral with a shaft 96, which supports gear 97 and 98. A worm screw 99, mounted on a shaft 101 engages tangential wheel 98, whereas another gear 102, integral with shaft 101, engages a worm 103 mounted on the shaft of motor $M_4$. Gear 97 engages a gear 104 integral with a shaft 106 carrying a gear 107 which engages a gear 108 integral with a shaft 109 supporting the contact arm $n_x$ of a contactor $N_x$ which comprises as many positions for electrical connections, as desired predetermined stop positions for carriage T. At the end of arm 101 there is mounted a cam $K_x$ adapted to open, during its rotation, the normally closed electrical contact $S_x$. The transmission between shafts 101 and 109 is determined so that, when arm $n_x$ changes from one position to the next, cam $K_x$ will make a complete rotation.

FIGURE 18 shows in schematic form, motor $M_4$, contact $S_x$ and contactor $N_x$ with its arm $n_x$. Contactor $N_x$ comprises two plates $g'_1$ and $g'_2$ each provided with studs 0, 1, 2, 3 . . . respectively corresponding to the successive predetermined positions of carriage T. Arm $n_x$ of the contactor moves between said plates and is provided with two opposed sliders which short-circuiting the studs with which they come into contact. Contact $S_x$ controls the feeding of relay $R_{80}$; which is normally closed, and opens when carriage T is exactly in a predetermined position, arm $n_x$ then short-circuiting the two studs corresponding to that position.

To studs 0, 1, 2 . . . of the plates, there correspond respectively relays $R_{50}$, $R_{51}$, $R_{52}$ . . . Each of these relays comprises three pairs of contacts $a$, $a'$, $b$, $b'$ and $c$, $c'$; when it is not actuated it is in the represented state. It is energized by a negative voltage being applied to the stud $0'$, $1'$, $2'$ . . . corresponding thereto at which time it is switched to the opposite state.

Relays $R_{81}$, $R_{82}$, $R_{83}$, and $R_{90}$ connected as indicated in FIGURE 18 are further provided. These relays are in the represented state when they are deenergized. Their function will be understood by reference to the description of their operation below.

When it is desired to bring carriage T to a certain pre-determined position, it will suffice to apply a negative voltage to terminal $0'$, $1'$, $2'$ . . . which corresponds to that position; for example, to terminal $4'$. Consequently, relay $R_{54}$ is switched to the opposite state, and its contacts therefore, $a'$, $b'$ and $c$ are closed, as indicated by the dotted lines. A negative voltage is thus applied through closed contact $R_{54a'}$, arm $n_x$ and closed contact $R_{54c}$, to the coil by relay $R_{81}$. The latter is energized, switched to the opposite state, and remains in that state by virtue of the closure of its contact $R_{81e}$. This is so because, soon after carriage T has left a predetermined position corresponding e.g. to studs 1, contact $S_x$ closes and applies the negative voltage to the coil of relay $R_{80}$. The latter is then switched to the reverse state and applies through its closed contact $R_{80d}$ the negative voltage to contact $R_{81e}$. Relay $R_{81}$ remains energized due either to the closure of contact $S_x$ or to the contacts of arm $n_x$ with a pair of studs of the contactor preceding studs 4; thus a negative voltage is applied through closed contact $R_{81f}$ to the terminal $d''$ of motor $M_4$, to cause carriage T to move towards the selected predetermined position and arm $n_x$ to move correspondingly towards the studs 4, i.e. to the right in the illustrative example.

When arm $n_x$ arrives at studs 4, as indicated by $n'_x$ relay $R_{81}$ cannot receive a negative voltage from arm $n_x$, since contact $R_{54c'}$ is open. On the contrary, remains energized due to closed contact $S_x$; and it is only when the carriage is exactly in the predetermined position that contact $S_x$ will open thus de-energizing relay $R_{81}$ which therefore is switched to the represented state. Then, motor $M_4$ stops due to the opening of contact $R_{81f}$.

It will be noted that, when arm $n_x$ was set on studs 1 of plates $g'_1$ and $g'_2$, the energization of relay $R_{54}$ caused an application of the negative voltage to the coil of relay $R_{90}$, through closed contact $R_{54a'}$, arm $n_x$, closed contact $R_{51c'}$ and closed contact $R_{50c'}$. Relay $R_{90}$ has thus been put to the reverse state and is maintained therein, due to the negative voltage applied to its coil through closed contacts $R_{54a'}$ and $R_{90a}$. Through closed contact $R_{90b}$, the positive voltage is applied to one of the terminals of the coil of relay $R_{84}$, the other terminal of which receives a negative voltage through closed contact $R_{54a'}$, arm $n_x$ which is assumed in position $n'_x$, and closed contacts $R_{55c'}$, $R_{56c'}$ . . . . Therefore relay 84 is energized and its contact $R_{84a}$ closes.

Consequently, if carriage T, driven by its own inertia, has gone beyond the preselected position, and, therefore, contact $S_x$ is closed again, the energization of relay $R_{80}$ would cause a negative voltage to be applied through closed contacts $R_{80d'}$, $R_{81d}$ and $R_{84a}$, to terminal $g''$ of motor $M_4$. Therefore this motor would rotate in an opposite direction and bring carriage P backwards, to another opening of contact $S_x$, i.e. until carriage T is exactly in the selected predetermined position.

If, initially, instead of being set to the studs 1 of the contactor, arm $n_x$ were set beyond hubs 4, to studs 6 for example, it would be driven by motor $M_4$ directly towards studs 4, after the application of the negative voltage to terminal $4'$. It may be ascertained that this would be so, by an operation similar to that above, except that relays $R_{82}$ and $R_{83}$ now replace relays $R_{81}$ and $R_{84}$. It now appears that the arrangement and set-up described here to ensure the position of transversed carriage T allows the carriage to pass from one position to another without returning to an initial position, i.e. in a minimum time.

The transversal carriage T is provided with two rails 111 (FIGURES 6, 7 and 9) provided to support and guide the frontal carriage F (FIGURE 10). The latter carries rollers such as 112 (FIGURES 9 and 10) which contact rails 111. Carriage T, moreover, supports the carriage F motion control mechanism. This mechanism is best clearly seen in FIGURE 9, and since it is very similar to the above mechanism for the transversal motion of carriage T, it will be only described briefly.

Motor $M_5$ controls the rotation of screw 115, through worm 114 and gear 116. Screw 13 engages a nut 117 fixed to the rear part of carriage F. The motor also controls, on one hand the rotation of the arm $n_y$ of a contactor $N_y$, and on the other hand the rotation of a cam $K_y$ which is designed, when rotating, to open a normally closed contact $S_y$. Contactor $N_y$ comprises as many positions, for electrical connections as they are predetermined stop positions, for carriage F and the coupling between and arm $n_y$ is such that cam $K_y$ performs a single rotation while arm $n_y$ of contactor $N_y$ changes from one position to the next.

The electrical set-up for controlling the rotation of motor $M_5$ is similar to that represented in FIGURE 18, wherein it is sufficient to replace $M_4$ by $M_5$, $S_x$ by $S_y$, $N_x$ by $N_y$, to understand the operation for a predetermined positioning of carriage F, as was seen for a predetermined positioning of carriage T.

Carriage F supports, as may be seen in FIGURE 10, pump $P_0$ and its driving mechanism which has been previously described, and which is represented in FIGURE 10 by a block 118. In front of carriage F, there may be seen two guides 83, which were described with respect to FIGURE 2, and engaging each two rollers 84 (FIGURE 2) mounted on pipette unit B. On the other hand, nut 61, which is fixed thereto, engages screw 62 (FIGURE 10) mounted on carriage F. It therefore appears that the pipette unit is maintained and guided in its vertical movement by guides 83 and that it is supported by screw 62. On the other hand, in FIGURE 10, there may be seen again motor $M_6$, and transmission $L_6$ connecting that motor to the lower end of screw 62. This transmission is not represented in detail; but it is readily apparent from a similar arrangement represented in FIGURE 9. The electrical set-up for controlling the rotation of motor $M_6$ may be similar to that of FIGURE 18, and it will be possible to stop the pipette block in a predetermined position selected from one of several provided all along the run of the pipette unit.

It has been seen previously that, at the end of the downward movement of the pipette unit, contact $S_{zb}$ actuates trigger $B_1$ of the set-up of FIGURE 13. It will now be observed that contact $S_{zb}$ may be replaced, or completed, by the contact (referred to below as $S'_{zb}$) to recall its analogy with contact $S_{zb}$ of a relay, unshown, which would be actuated when the pipette unit reaches, on its downward movement, the predetermined position selected for its stop. Thus, it will be possible to select the lower position of the pipette unit by application of the negative voltage to one of a number of terminals corresponding to 0', 1', 2', 3' . . . on the set-up of FIGURE 18 corresponding to desired lower positions.

In the very front part of carriage F (FIGURE 10), there are two guides 119 for guiding the gripping unit G represented at a greater scale in FIGURE 11. On the latter figure, there may also be seen guides 119 which support rollers 121 integral with frame 122 of the gripping unit. The vertical movements of the latter are effected by a motor $M_7$ (FIGURE 10) driving a pulley 124, through a gear reducer 123, represented by a block in FIGURE 10. Motor $M_7$ and reducer 123 are located within carriage F; whereas pulley 124 is on its side; two other pulleys 126 and 127 are also provided; and as may be seen in FIGURE 5, a cable 128 passes on these three pulleys, and its ends are attached to a pawl 129, integral with gripping unit G. Thus it appears that the rotation of motor $M_7$, in either direction, causes the up or down movement of gripping unit G.

The gripping unit G supports a device for taking and laying down the vessels. This device comprises two claws 131 mounted at the lower ends of two rods 132 and 132' provided at their upper ends with two engaged gears 133 and 133'. Claws 131 are preferentially enveloped in a sheath 135 of rubber or a similar material. Rod 132 supports a lever 134, an end of which is attached on one hand to the core of a magnet $E_1$ by a rod 136, and on the other hand to a coil spring 137. Rods 132 and 132' are guided in holes provided in the frame 122, and wherein they may rotate. On the other hand, they pass through holes provided in a plate 138. The latter is supported, vertically, by rods 132 and 132', and it supports in turn in a slidable manner a third rod 139 which supports in its lower end a stop disk 141, and the upper part of which is designed to close a normally open contact $S_{z'b}$. Another contact $S_{z'h}$ is mounted on the gripping unit; this other contact, normally open, is closed when the gripping unit, reaching its high position, brings it to butt against a pawl 142 (FIGURE 10) provided for this purpose on carriage F.

It will be noted that when magnet $E_1$ is not actuated, spring 137 pulls lever 134, which maintains or brings back claws 131 to the closed position. The actuation of magnet $E_1$ makes rod 136 pull on lever 134 to overcome the force of spring 137. Lever 134 then undergoes pivotal movement and rotates rod 132 directly and rod 132' indirectly, through gears 133 and 133', consequently causing claws 131 to open.

The electrical control circuit of the device for gripping or laying down the vessels is represented in FIGURE 17. Said figure shows again motor $M_7$, magnet $E_1$. Additionally the circuit comprises:

A trigger $B_{14}$ with five pairs of contacts $a$, $a'$, $b$, $b'$, $c$, $c'$, $d$, $d'$ and $e$, $e'$; this trigger is energized by the closure of contacts $S_{z'h}$ and $S_{z'b}$; the closure of contact $S_{z'h}$ sets it to the represented state; that of contact $S_{z'b}$ switches it to the opposite state.

A trigger $B_{15}$ with three contacts $a$, $b$, $c$, energized either by the closure of contact $S_{z'h}$ or by the application of the negative voltage to terminal 143. In the first case, trigger $B_{15}$ is switched to the represented state; in the second case, it is switched to the opposite state.

A trigger $B_{16}$ with three contacts $a$, $b$, $c$, energized either by the closure of contact $S_{z'h}$ or by an application of the negative voltage to terminal 144. In the first case, trigger $B_{16}$ is switched to the represented state; in the second case it is switched to the opposite state.

To follow the operation of the gripping unit, and of its control device, it will be supposed: on one hand that claw 131 and stop disk 141 are just above the vessel to be engaged, for example vessel 78 in FIGURE 5; and, on the other hand that the gripping unit is in the upper position, therefore that contact $S_{z'h}$ is closed and that, consequently triggers $B_{14}$, $B_{15}$, $B_{16}$ are in the represented state.

Under these conditions, to seize vesesl 78, it will suffice to apply the negative voltage to terminal 144 of trigger $B_{16}$. This trigger switches to the opposite state. The negative voltage is thus applied through closed contacts $B_{16b}$ and $B_{14c'}$ to terminal "—" of magnet $E_1$; the latter is actuated and opens claws 131. On the other hand, the positive voltage is applied through closed contact $B_{16a}$ to the terminal "+" of motor $M_7$, which, on the other hand, through closed contact $B_{14a'}$, receives the negative voltage at terminal D. Motor $M_7$ is driven and causes the gripping unit to move downwards. When disk 141 comes against the upper edge of vessel 78, rod 139 stops moving down whereas the gripping unit continues moving downwards. It follows that contact $S_{z'b}$ closes and switches trigger $B_{14}$ to the opposite state. The opening of contact $B_{14c'}$ releases magnet $E_1$; spring 137 then closes claws 131 around the neck of vessel 78, below the rim 78' provided on the latter. On the other hand, the opening of contact $B_{14a'}$ interrupts the application of the negative voltage to terminal D of motor $M_7$ whereas the closure of contact $B_{14b}$ causes a negative voltage to be applied to the terminal M of that motor. Then the latter rotates in the opposite direction, and drives the gripping unit which raises vessel 78 in its claws 131. When the gripping unit reaches the high position, contact $S_{z'h}$ closes again and brings triggers $B_{14}$ and $B_{16}$ back to the represented state. The initial conditions are now obtained again, except that vessel 78 is held by claws 131 and may be brought to another place on the operation table by the motion of carriages T and F as seen above.

To lay down the vessel, it will suffice to apply the negative voltage to terminal 143 of trigger $B_{15}$. The latter is switched to the opposite state. Thus the positive voltage is applied through closed contact $B_{15a}$ to the positive terminal of motor $M_7$ to which is applied, on the other hand, through closed contact $B_{14a'}$, the negative voltage on its terminal D. Motor $M_7$ then moves down the gripping unit. When the vessel carried by the latter comes into contact with the operation table, disk 141 and rod 139 cease moving down, whereas the gripping unit continues moving down. Therefore, contact $S_{z'b}$ closes and consequently trigger $B_{14}$ is switched to the opposite state. The negative voltage is then applied, through close contacts $B_{15b}$ and $B_{14d'}$, to the negative terminal of magnet $E_1$. The latter is actuated and opens claws 131, and vessel 78 is then released. On the other hand, on the opening of contact $B_{14a'}$, the negative voltage ceases being applied to terminal D of motor $M_7$, whereas the closure of contact $B_{14b}$ causes the negative voltage to be applied to the terminal M of that motor. The latter drives the gripping unit upwardly which leaves the vessel on the operation table. When the gripping unit reaches the upper position, contact $S_{z'h}$ closes once more and brings triggers $B_{14}$ and $B_{15}$ back to the represented state. The present conditions are the initial ones, except that vessel 78 is now placed at another location of the operation table.

The work table is not represented in FIGURE 5, except by the two planes $P_1$ and $P_2$ which symbolize two operation planes. In the following, there will be described a specific embodiment of a work table, but for the present it will be only indicated that it may comprise more than two operation planes, and may support or contain all the special devices and functional assemblies which might be needed to perform automatically operations which are as varied as possible. Of these devices and assemblies, there has already been mentioned a washing vat, and photocolorimeter, a scintillator with a scintillation counter, a pulse counter; we may also mention: a device for agitating the contents of the vessels, a heating station, a water bath, an evaporator, a weighing device, a vessel washing automatic device, a pH meter, a Geiger counter, a centrifuge, etc.

A photocolorimeter may be arranged so as to compare, for example from the optical absorption point of view, the sample to be analyzed with a given area considered in a point movable along an optical device with a sampled variable absorption, wherein the movement of the point is controlled by the difference between the compared values, so that this movement tends to bring the difference to zero (conditionment, so that, consequently, the point becomes motionless when this difference is null; and wherein the result of the analysis is indicated directly or indirectly by the movement of the point at the instant of its immobilization, this movement being measured with respect to a reference origin.

The centrifugator should be arranged to be stopped in precise predetermined angular positions, so that the vessels it comprises may be immobilized in turn under the pipette.

From the above, it appears that the result of the analyses and similar operations are often given by reading the level of the liquid in the pipette or the apparatus indicating voltage $V_2$. Other parameters may also be used, as for example that which would be related to the measure of the movement of the point used in the optical wedge of the above photocolorimeter. According to a preferred feature of the invention, it is provided to record said results either by recording on a moving tape a graph of voltage $V_2$ or any other parameter corresponding to the measure which is desired to be effected, or by photographing the pipette or the apparatus indicating voltage $V_2$ or the above mentioned parameter, or else by means of an electrical typewriter provided to give a cyphered indication corresponding to the value of voltage $V_2$ or to that of that parameter.

It also appears from the foregoing description that the operations indicated are performed by applying, according to an order suitably selected with respect to the operations to be performed, the negative voltage to some terminals of that apparatus which will be called control terminals below, and which comprise, for example: terminals 27, 27' (FIGURE 12), terminals 71', 72', 73, 73', 74', 76', 77' (FIGURE 13), terminals 0, 1, 2 . . . of relays $R_{20}$, $R_{21}$, $R_{22}$ (FIGURE 14), terminals 143, 144 (FIGURE 17), etc. The application of the negative voltage to a control terminal may be remote controlled; it is obvious that the operations performed by the apparatus may be remote controlled without any difficulty. But moreover, the apparatus lends itself specially well to the automatic execution of an operation cycle, due to a special arrangement which is a special object of the invention and which will be described below.

It will be first observed that the application of a negative voltage to one of the control terminals causes the execution of an operation which may be complex or simple. Thus the application of the negative voltage to terminal 72' causes the washing and drying of the pipette, and on the other hand, it has been seen that to take liquid into by the pipette may require the application of the negative voltage to several terminals. Therefore, to avoid all confusion, the application of a negative voltage to a control terminal will be spoken as an "instruction," this application causing a simple or multiple operation or part of an operation.

When the apparatus is desired to perform a given operation cycle or program, the first step will consist in working out a sequence of instructions corresponding to that program; then the program will be recorded instruction by instruction. According to a preferred feature of the invention such a recording is coded so that to every given instruction there correspond $n$ characteristic pulses selected out of $m$ successive possible pulses. For a better understanding, let it be supposed that the code used in a three out of eight pulse code; to a certain instruction, there will correspond the first, second, and third pulses; to another instruction, the first, second and fourth pulses, etc., this provides a code for 56 instructions. However, it will be understood, that $n$, and principally $m$, will in general be selected greater than this, so that the number of instructions available will be sufficient to realize all the programs that might be needed.

In the general arrangement shown in FIGURE 19, the coding is made by means of a coding device comprising an instruction setting device CP, a coding selector SC and a pulse generating and grouping arrangement 157. The decoding is performed by means of a decoding device comprising a pulse separating arrangement 156, a decoding selector SD and an instruction distributor RP. A magnetic recorder MA is inserted between the coding device and the decoding device.

The instruction setting device CP is arranged so that, for each set instruction, the negative voltage is applied to three of its eight coding terminals 1, 2, 3, 4, 5, 6, 7, and 8, these three terminals characterizing said instruction. The setting of an instruction may be made for example by means of a push button keyboard or by means of rotatable contactors. For a better understanding, the latter case has been represented in the drawings in a very simplified way by a four-plate contactor 160. The three lower plates are used for the coding. Their sliders receive the negative voltage; their studs are connected to the coding terminals 1, 2 . . . 8, so that, for each angular position of the contactor, to which there corresponds an instruction, the negative voltage is sent to the three coding terminals characterizing this instruction. The upper plate is used for an uncoded remote control. Its slider is connected to a trigger $B_{17}$; its studs are connected to terminals $1_c$, $2_c$, $3_c$, $4_c$, $5_c$, etc. . . . respectively, of the instruction distributor RP, which are connected respectively to the control terminals 72', 71', 73, 73', 74', etc., as previously indicated, and for each angular position of the contactor, to which there corresponds an instruction, the slider of the contactor upper plate is set on the stud connected to the terminals $1_c$, $2_c$, $3_c$, corresponding to that instruction.

On the other hand it will be noted that the application of the negative voltage to one of terminals $1_c$, $2_c$, $3_c$ . . . is equivalent to the application of the negative voltage to the corresponding control terminal 72', 71', 73. . . . It would therefore be normal to desginate terminals $1_c$, $2_c$, $3_c$ . . . as control terminals; however, to avoid all confusion, they will be called "instruction terminals," since the application of the negative voltage to one of them causes the corresponding instruction to be executed.

It will be remarked that contactor 160 is not by itself sufficient to direct the negative voltage towards a very great number of instruction terminals. Practically several contactors will be used, each one being assigned to a group of predetermined instructions. For clearness sake, there has been represented only one contactor, but it is easy to imagine other contactors similar to contactor 160 and operated instead, depending upon the group of instructions to which the instruction to be executed belongs.

Coding selector SC is represented in FIGURE 20. It comprises four plates $G_a$, $G_b$, $G_c$, $G_d$, with their respective sliders, $C_a$, $C_b$, $C_c$, $C_d$. Each plate comprises eleven useful studs, which will be designated by 0, 1, 2, 3, . . . and 10.

Plate $G_d$ is used for the advance step by step of the selector. Its stud of order 0 is an idle stud; the following ten studs 1 to 10 are interconnected and receive the negative voltage. Relay $T_4$ which operates a motor making the sliders advance step by step, has its coil connected to a terminal 147 and to the contact of a relay $R_{133}$, the coil of which is connected, on one hand to slider $C_d$, and, on the other hand to the contact $a$ of relay $T_4$. Under these conditions, if due to a so-called instruction key BP (see FIGURE 19), and through a switch $Ma$, the negative voltage is applied to terminal 147, relay $T_4$ is energized and causes the advance by one step of the sliders of selector SC; slider $C_d$ then passes to the stud 1 of plate $G_d$; the coil of relay $T_4$ is then fed under the control of relay $R_{133}$ the coil of which is fed under the control of said relay $T_4$, which causes the automatic, step by step advance of sliders $C_a$, $C_b$, $C_c$, $C_d$, which change from the studs 1 to the studs 2, then from the latter to the studs 3, etc., up to the studs 10, and finally to the studs 0, since the selector is of the rotating type. When slider $C_d$ is set again on the stud 0 of plate $G_d$, the automatic advance of the sliders is stopped, since this stud does not receive the negative voltage.

Plate $G_c$ of selector SC is used for the coding. Its studs 0, 1, 2 are idle studs; the next eight studs, which will be called coding studs, are connected respectively to the eight coding terminals 1, 2, 3 . . . 8, of instruction setter CP. Thus, only to the coding studs connected to the coding terminals which receive the negative voltage will be applied with a negative voltage. Slider $C_c$ moved step by step as seen previously will then send to the coil of relay $R_{136}$ the negative voltage when it is set on a coding stud receiving itself the negative voltage. The application of the negative voltage to the coil of relay $R_{136}$, causes the contact $a$ of that relay to close and therefore condenser 154 to be discharged, its charge having been made through the contact $a'$ of relay $R_{136}$ before the latter was energized. Consequently, whenever slider $C_c$ passes onto a coding stud receiving the negative voltage, a short pulse is applied to the coil of relay $R_{137}$; consequently, the contact $a$ of that relay opens, and therefore, an oscillator 151 provided to operate only when contact $R_{137a}$ is open, is actuated. If it is observed that, in the special illustrative example, three only of the eight studs receive the negative voltage, it will be understood that slider $C_c$, when passing along the coding studs, generates, at the output of oscillator 151, three rectangular pulses each composed of oscillations at the operative frequency of that oscillator, the timing of these three pulses corresponding to the three coding studs receiving the negative voltage and characteristic of the coded instruction.

For example, if, for a certain instruction, the negative voltage is applied through contactor 160 on the three coding terminals 1, 2 and 4, there will appear, at the output of oscillator 151, three successive characteristic pulses as represented at $I_c$, i.e. there will be first two successive pulses corresponding to coding terminals 1 and 2, then an interval or absence of pulses corresponding to the unenergized terminal 3, then a third pulse corresponding to terminal 4, and finally four intervals or absence of pulses corresponding to unenergized coding terminals 5, 6, 7 and 8. The timing of the three characteristic pulses $I_c$ corresponds to the considered instruction; for another instruction the timing would be different.

Plate $G_b$ of selector SC is used for the timing. Its studs 0 and 1 are idle studs; the next nine, which will be called timing studs are connected to one another and receive the negative voltage. Slider $C_b$ moved step by step, as seen previously, will send, therefore, when it is set on a timing stud, the negative voltage to the coil of relay $R_{134}$. It results in closing the contact $a$ of that relay, and in the discharge of condenser 153, the charge of which was made through contact $a'$ of relay $R_{134}$, when the latter was off. The discharge of condenser 153 through the coil of relay $R_{135}$, causes the contact $a$ of that relay to open, and consequently an oscillator 150 is operative only when contact $R_{155a}$ is open. Therefore, it appears that the passage of slider $C_b$ along the timing pulses generates, at the output of oscillator 150, nine rectangular timing pulses $I_s$ following one another at the speed of the slider passage along the studs and each composed of oscillations at the operative frequency of that oscillator. This frequency will be different from that of oscillator 151; it may be for example of 2000 kilocycles, whereas the frequency of the oscillator 151 will be selected of 500 kilocycles.

The timing pulses and the characteristic pulses, after their superposition and amplification in an amplifier 152 are then applied together to terminal 149 and therefrom to the recording head TE of magnetic recorder or magnetophone MA (FIGURE 19).

Plate $G_a$ of selector SC is used to start the magnetophone MA. All the studs of that plate are idle studs, except the studs 1 and 2, which receive the negative voltage. The corresponding slider $C_a$ is connected to terminal 148 (see also FIGURE 19) and therefrom to the coil $m$ of a trigger $B_{11}$ which actuates magnetophone MA. Slider $C_a$ being step-by-step displaced as hereinbefore indicated applies the negative voltage to coil $m$ of trigger $B_{11}$ when passing to stud 1, which causes the starting of MA. The passage of slider $C_a$ to the stud 2 renews the magnetophone starting control; therefore this starting is insured and accordingly the timing pulses and the pulses characterising the coded instruction are recorded on the magnetophone magnetic tape.

The latter is advanced past the reading head TL of MA, and the collected mixed pulses are applied to terminal 145 of the pulse separating device 156, which may also be seen in FIGURE 21, and which comprises a separating amplifier 155. The latter operates the separation, due to the difference between the supporting frequencies corresponding to the pulses to be separated (500 and 2,000 kilocycles in the illustrative example); and at its output, are collected, on one hand, the characteristic pulses $I_c$, and, on the other hand, timing pulses $I_s$.

Pulses $I_c$ and $I_s$ are applied respectively to the coils of relays $R_{131}$ and $R_{132}$, the respective contacts $a$ of which are momentarily closed on the passage of each pulse. Contact $R_{132a}$ transmits negative voltage pulses corresponding in time with the timing pulses $I_s$, and contact $R_{131a}$ transmits negative voltage pulses timed as pulses $I_c$, and consequently characteristic of the coded instruction.

The decoding selector SD comprises five plates $G'_a$, $G'_b$, $G'_c$, $G'_d$, $G'_e$ with their respective sliders $C'_a$, $C'_b$, $C'_c$, $C'_d$, $C'_e$. Each plate comprises eleven useful studs which may be designated, 0, 1, 2, 3 . . . 10.

Plates $G'_b$, $G'_c$ and $G'_d$ are used for the step-by-step advance of the selector. Their studs are connected as illustrated in FIG. 21. Slider $C'_b$ is connected to contact $R_{132a}$; whereas the sliders $C'_c$ and $C'_d$ are connected to the ends of the coil of a relay $R_{130}$, the contact $a$ of which controls the operation of relay $T'_4$ which ensures the simultaneous step-by-step advance of all the sliders of the selector. Under these conditions, each negative voltage pulse applied through contact $R_{132a}$, to slider $C'_b$, causes the actuation of relay $R_{130}$, and consequently that of relay $T'_4$, therefore the advance by one step of the sliders which thus change from the studs 0 to the studs 1, then to the studs 2, up to the studs 9, at the rate of the application of the timing pulses $I_s$ to the coil of relay $R_{132}$. When the sliders are on the studs 9 no impulsion $I_s$ is transmitted; but then the coil of relay $R_{130}$ receives the negative voltage through slider $C'_c$, and the positive voltage through relay contact $T'_{4a}$ which is closed when the coil of relay $T'_4$ is not energized; thus relay $R_{130}$ is actuated, and consequently, relay $T'_4$. The sliders then pass along the studs 10, and thence, by repetition of the same process, to the studs 0, since the selector is of the rotating type.

Plate $G'_e$, of selector SD is used to control the stop of the magnetophone. All the studs of that plate are idle studs, except the studs 9 and 10, which receive the negative voltage. Corresponding slider $C'_e$, is connected to terminal 146 (see also FIGURE 19) and thence to the coil $a$ of trigger $B_{11}$. Slider $C'_e$ being advanced step-by-step, as seen previously, when it comes to the stud 9, it applies the negative voltage to the coil $a$ of a trigger $B_{11}$, which causes magnetophone MA to stop. When cursor $C'_e$ reaches the stud 10, it renews the control of the magnetophone; therefore, this stopping is actually ensured.

Plate $G'_a$ of selector SD is used for decoding. Its studs 0, 9 and 10 are idle studs; its studs 0, 1 to 8, which will be called decoding studs, are connected respectively to the decoding terminals 1 to 8 (FIGURE 19) of the instruction distributor RP. Slides $C'_a$ is connected to contact $R_{131a}$ (FIGURE 21) and its step-by-step advance is controlled, as seen previously, by timing pulses $I_s$. If it is observed that relay $R_{131}$ is actuated by characteristic pulses $I_c$, it will be understood that the negative voltage is momentarily applied, through contact $R_{131a}$ and slides $C'_a$, to three only of the decoding studs, and thence to only three decoding terminals 1 to 8 of the instruction distributor RP, these three terminals being determined by the timing of the characteristic pulses $I_c$ applied to the coil of relay $R_{131}$; thus for the instruction previously considered, decoding terminals 1, 2 and 4 will receive momentarily the negative voltage, the other decoding terminals receiving nothing.

The instruction distributor RP comprises eight main relays $R_A$, $R_B$, $R_C$ . . . $R_H$ each provided with a contact $a$ normally receiving the negative voltage, through the contact $a$ of a relay $R_{113}$ and of contact $B_{14e}$, of trigger $B_{14}$, already described with reference to FIGURE 17. The negative voltage momentarily applied by selector SD to one of the decoding terminals 1 to 8 causes the main relay corresponding to that terminal to be operated. The contact $a$ of this relay is then closed, and it is maintained closed by the negative voltage applied from contact $R_{113a}$. Thus for the special illustrative instruction, the negative voltage is momentarily sent to the decoding terminals 1, 2 and 4, and it results in the closure of contacts $R_{Aa}$, $R_{Ba}$ and $R_{Da}$, which will remain closed, and will maintain the negative voltage applied to decoding terminals 1, 2 and 4 as long as contacts $R_{113a}$ and $B_{14e}$, are closed.

Distributor RP further comprises a set of secondary relays $R_{S1}$, $R_{S2}$, $R_{S3}$ . . . $R_s$ represented in FIGURE 22, relay $R_{S1}$ being also represented in FIGURE 19. The secondary relays are arranged and connected so as to apply the negative voltage to the instruction terminal or terminals $1_c$, $2_c$, $3_c$ . . . corresponding to the considered instruction. Thus, for the special instruction corresponding to the three decoding terminals 1, 2 and 4, it is seen: that the negative voltage applied to decoding terminal 4 reaches the coil of relay $R_{S15}$ which is put to the reverse state; that the negative voltage applied to decoding terminal 2 then reaches the coil of relay $R_{S25}$ which is switched to the reverse state, and that the negative voltage applied to decoding terminal 1 then reaches instruction terminal $1_c$. This starts the execution of the special considered instruction. When the execution of an order is completed, the negative voltage is sent, under the control of a co-ordination and safety device which will be seen later on, to the coil of relay $R_{113}$ (FIG. 19); the contact $a$ of the latter then opens, and all the main and secondary relays of distributor RP cease being fed and are switched back to the represented state.

The co-ordination and safety device illustrated in FIG. 19 comprises triggers $B_3$, $B_2$, $B_7$ as previously described in relation to FIG. 13, but here additional contacts are used $B_{3f}$, $B_{3g}$, $B_{2f}$, $B_{2g}$, $B_{7f}$, $B_{7g}$. It also comprises contacts $B_{15c}$, $B_{16c}$, also visible in FIGURE 17. It further comprises triggers $B_9$, $B_{10}$, $B_{17}$, a relay $R_{111}$, two delayed relays $R_{t0}$ and $R'_{t0}$ and relays such as $R_{103}$ and $R_{104}$, the coils of which are inserted in the supplying leads of motors $M_3$, $M_4$, $M_5$, $M_6$, previously described. Only relays $R_{103}$ and $R_{104}$ of motor $M_3$ have been shown here, but it is easy to imagine, for motors $M_4$, $M_5$, $M_6$, similar relays connected, as relays $R_{103}$ and $R_{104}$, so as to control the feed of relay coil $R'_{t0}$. All relays and triggers of the co-ordination and safety device are arranged and connected as represented in FIGURE 19, and their operation will appear from the following description of the operation of the apparatus in accordance with the invention.

First, it will be noted the presence of indicating board TM provided with compartments such as 158 to indicate in terms or within easily understandable symbols, the operations corresponding to the various instructions. For example, compartment 158 will be formed of a ground glass bearing the indication; "Pipette washing and drying," and will correspond to the composite operation previously described under title "Automatic washing and drying of the pipette," which is executed by the application of the negative voltage to instruction terminal $1_c$. A lamp 159 is provided for the lighting of the compartment, this lighting is strong when the negative voltage is directly applied to the lamp; it is weak when the negative voltage is applied through a resistance $r''$, before being applied to the lamp (FIG. 19). As a principle, there will be as many compartments or equivalent elements as possible instructions to be executed and these compartments will be adapted to the nature of the instructions to which they correspond. Thus, to indicate the position of movable cell $Cm$, there will be, for example, a row 166 of narrow compartments, with thereover a row 164 of long compartments; the latter will correspond to the preselection of the selector plates as explained with reference to FIGURE 15, whereas the narrow compartments will correspond to the selection of the plate studs. A long compartment such as 167, when lighted, will indicate a plate preselection instruction, and a narrow compartment, such as 168, opposite the long compartment, when lighted, will correspond to the position of the movable cell along the pipette. To indicate the positions of the pipette according to directions $x$ and $y$ of FIGURE 5, the compartment may be replaced by rows of neon lamps; the latter will be arranged in a square pattern on the indicating board, so as to form, on one hand, vertical rows corresponding to the positions of the pipette according to direction $x$, and, on the other hand, horizontal rows corresponding to the pipette positions along co-ordinate $y$, respectively. Thus, the pipette position on the operation table will be represented, on the indicating board, by the intersection, such as 163, of an horizontal row; such as 161, with a vertical row, such as 162.

To record an operation cycle, switch $Ma$ is set on recording position $En$, i.e. the position where the switch arm are represented in full lines in FIGURE 19, then the contemplated program is recorded, instruction by instruction. For a better understanding, it will be assumed that the first instruction to be recorded is the pipette washing and drying instruction. To be recorded, such an instruction is first set on setter CP, contactor 160 being placed in the position corresponding thereto; thus a negative voltage is appled on the one hand to the three coding terminals 1, 2 and 4, for example, which correspond to the given instruction, and, on the other hand, through resistor $r''$ to lamp 159 of compartment 158. This compartment is thus weakly lighted, and make the washing and drying indication appear; it is thus visually assured that the instruction which is set is actually the desired one. Then instruction process key BP is depressed, which causes the negative voltage to be applied to terminal 147 of the decoding selector SC. This selector is started, and the timing pulses $I_s$, as well as the pulses $I_c$, corresponding to the subject instruction, are sent to the recording head TE of magnetic recorder MA, the starting of which has been automatically controlled by selector SC applying the negative voltage to terminal 148, and therefrom to coil $m$ of trigger $B_{11}$ which controls the run of the magnetic recorder.

Pulses $I_s$ and $I_c$ are then recorded on the magnetic tape which is then advanced under the reading head TL of the magnetic recorder. Then to terminal 145, there are applied timing pulses $I_s$ and pulses $I_c$ characterizing the instruction. Pulses $I_s$ control the step-by-step advance of the decoding selector SD, whereas pulses $I_c$ cause the negative voltage to be applied to decoding terminals 1, 2 and 4 of the instruction distributor RP. When this is done, selector SD applies the negative voltage to terminal 146 and therefrom to the coil $a$ of trigger $B_{11}$, which causes the magnetic recorder to stop.

The instruction distributor RP directs, as seen previously, the negative voltage from contact $R_{113a}$ towards instruction terminal $1_c$, which causes a negative voltage to be sent on one hand to lamp 159, ensuring a strong lighting of compartment 158, and, on the other hand, to control terminal 72' (see also FIG. 13), causing the trigger $B_3$ to be switched to its opposite state and the subject instruction starts being executed. In addition, the switching of trigger $B_3$ causes contact $B_{3f}$ to open and contact $B_{3g}$ to close. Through the latter, the negative voltage is applied, on one hand to the coil of relay $R_{t0}$, contact $R_{t0a}$ closes and, on the other hand, to the coil $i$ of trigger $B_9$, which causes contact $B_{9a}$ to close, and consequently, the lighting of a light indicator VL.

When the pipette is washed and dried, trigger $B_3$ is switched back to its initial state, as previously seen. In this connection, it will be noted that trigger $B_3$ is arranged so that the application of a negative voltage to terminal 72 causes it to be switched to the initial state shown in the figure, even if the negative voltage is still applied to terminal 72'; similarly, as concerns triggers $B_2$ and $B_7$, the action of the coil which causes them to be switched to the state represented in the figure is preponderant over the action of the coil causing them to be switched to the opposite state. Consequently, when the washing and drying of the pipette is completed, contact $B_{3f}$ is closed, whereas contact $B_{3g}$ is opened, which opening interrupts the supply of the coil of relay $R_{t0}$; but as the latter is delayed at the start, contact $R_{t0a}$ remains closed long enough for a negative voltage to be sent through this contact and closed contact $R_{111a}$, $B_{7f}$, $B_{2f}$, $B_{3f}$, to the coil of relay $R_{113}$; which causes contact $R_{113a}$ to open, and consequently all the relays of instruction distributor RP are switched back to their initial state, and a negative voltage is no longer applied to instruction terminal $1_c$, and compartment 158 is again weakly lighted.

On the other hand, the negative voltage from contact $R_{t0a}$ is also applied, on one hand, to instruction counter CI which is stepped one unit, thus counting the just executed instruction, and on the other hand to coil $r$ of trigger $B_9$ which is switched back to its initial state, thus causing indicating light VL to be turned off. It appears therefore that one can check visually the successive steps which have led to the execution of the instruction. Besides, this instruction being executed through the record made on the magnetic tape, one is immediately confirmed that the recorded instruction is actually that which is desired to be executed. It is then possible to proceed safely to the recording of the next instruction. If, perchance, an error had been found, it would have sufficed to delete the erroneous instruction from the magnetic tape, then to do the recording again, avoiding reproducing the error. To erase the record of an erroneous instruction, the magnetic tape is driven back so as to make the tape portion bearing the record to be erased as it passes under erasing head EF.

The recording of the other instructions of the contemplated program will be performed the same as that of the illustrative instruction. The process followed will be substantially the same when the instruction is one controlled by triggers $B_2$ or $B_7$; it will be slightly different when the subject instruction involves the operation of one of motors $M_3$ to $M_6$. In the latter case, contacts $a$ and $c$ of relay $R_{111}$ will have the same function as contacts $f$ and $g$ of trigger $B_3$ for the execution of the pipette washing and drying instruction. If for example the instruction is one which involves motor $M_3$, and it is observed that, on the execution of that instruction the negative voltage is applied to one of terminals M or D of motor $M_3$, it will be understood that, so long as this motor is driven, either of relays $R_{103}$ or $R_{104}$ is actuated, therefore the negative voltage is sent only to the coil of relay $R'_{t0}$, and consequently the negative voltage is then applied to the coil of relay $R_{111}$. The latter therefore is in the reverse state so long as motor $M_3$ is driven, and it remains in this state even if there is a momentary stop of motor $M_3$, because relay $R'_{t0}$ is delayed at the start. On the other hand, when the instruction is executed, motor $M_3$ stops for more than the delay at the start of contact $R'_{t0a}$; thus this contact opens and relay $R_{111}$ turns back to the state represented. Therefore contacts $R_{111a}$ and $R_{111b}$ close, and the negative voltage is applied, on one hand, to the coil of relay $R_{113}$, and, on the other hand to the coil $r$ of trigger $B_9$ and instruction counter CI, according to a process similar to that which has been seen for the pipette washing and drying instruction. When the instructions concern the taking or laying down of a vessel, as seen with reference to FIGURE 17, contacts $B_{15c}$ and $B_{16c}$ will perform a function similar to that fulfilled by relays $R_{103}$ or $R_{104}$ for an instruction wherein motor $M_3$ is active. It will be further remarked that when the gripping unit C is brought to its lower position, contact $B_{14e}'$ opens; instruction distributor RP then returns to the represented state, and it is now impossible to perform any instruction decoding so long as contact $B_{14e}'$ is not closed, i.e. so long as gripping unit G is not returned to its higher position.

To perform the reproduction of a recorded program of instructions the corresponding magnetic tape is inserted in the magnetic recorder, switch M$a$ is set to the reproduction position R$e$, i.e. the position for which the arms of the switch are represented in dotted lines in FIGURE 19, then the reproduction button BR is depressed. The negative voltage is thus applied by this button to the coil $m$ of trigger $B_{11}$; it results in the starting of magnetic recorder MA. Reading head TL then applies to terminal 145 the pulses corresponding to the first instruction recorded on the magnetic tape, which cause this instruction to be executed, as seen previously. Once the first instruction has been sent to distributor RP, selector SD applies the negative voltage to terminal 146 and therefrom to the coil of a trigger $B_{11}$, which causes the magnetic recorder to be stopped. When the first instruction is executed, the negative voltage is applied as in the case of recording to the coil of relay $R_{113}$; but now it is further sent through the upper arm of switch M$a$ to the coil $m$ of trigger $B_{11}$, which causes the magnetic recorder to start again, and consequently the execution of the second instruction recorded on the magnetic tape, and so on. The same process is repeated for all the instructions of the recorded program, the completion of the execution of an instruction starting the execution of the following instruction, up to the complete execution of all the instructions of the recorded program.

To use the apparatus in a simple remote control operation, without any recording, switch M$a$ is set in the remote control position T$e$, i.e. the position for which the counter arms are represented by dashes. The instruction setter CP is also used, but this time the upper plate of contactor 160 is operated. When the contactor has been set in the position corresponding to the instruction which is desired to be executed, if instruction process key $B_p$ is depressed, the negative voltage is applied through this key and through switch M$a$, contact $R_{111d}'$, contact $B_{17a}$ and the slider of the upper plate of contactor 160 to the instruction terminal $1_c$, $2_c$, $3_c$ . . . corresponding to the subject instruction, for example terminal $1_c$, if the instruction on consideration is the pipette washing and drying instruction. The execution of that instruction is then started by the switching of trigger $B_3$, as seen previously, with reference to the recording of said instruction, and through closed contact $B_{3g}$, the negative voltage is applied to coil $i$ of trigger $B_9$, which causes light indicator VL to be ignited. When the execution of the subject instruction is completed, trigger $B_3$ is switched back to the represented state, and through closed contact $B_{3f}$ the negative voltage from contact $R_{t0a}$, still closed, is applied on one hand to coil $r$ of trigger $B_9$, which causes the switching off of indicating light VL, and, on the other hand, to the order counter CI which is advanced by one unit.

When the operation to be executed by remote control involves the actuation of relay $R_{111}$, the starting of this order causes contact $R_{111d}$ to close; through this contact, the negative voltage from key BP is sent to the coil $i$ of trigger $B_{17}$ which is switched to the reverse state; it results in the closing of contact $B_{17a}'$, and through the latter contact the negative voltage from switch $Ma$ is applied to that instruction terminal $1_c$, $2_c$, $3_c$, which corresponds to the instruction. This shows that the execution of that instruction is still ensured, even after the opening of contact $R_{111d}$. On the other hand, during this execution, the negative voltage will reach, through contact $R_{111c}$ then closed the coil $i$ of trigger $B_{10}$; it results in closing contact $B_{10a}$, and in applying through this contact the negative voltage on one hand to the coil of relay $R_{t0}$ which is switched to its opposite state, and on the other hand to the coil $i$ of trigger $B_9$, which causes indicating light VL to be ignited. When the instruction is executed, relay $R_{111}$ is switched back to its initial state, and the negative voltage is then sent through closed contacts $R_{t0a}$, $R_{111a}$, $B_{7f}$, $B_{2f}$ and $B_{3f}$, to the coils $r$ of triggers $B_9$ and $B_{17}$ respectively, which are thus switched back to their initial state. On the other hand, the negative voltage is applied through closed contact $B_{111b}$ to coil $r$ of trigger $B_{10}$ which is switched back to its initial position. From this results the switching back of relay $R_{t0}$ to its initial state, and consequently, the opening of contact $R_{t0a}$ when the delay provided at the opening of the latter has elapsed.

In the above description, the operation of the assembly represented in FIGURE 19 has not been considered in all its details, but the points omitted can be derived by examination of this figure, and of those completing it. On the other hand, what has been considered is sufficient to show that the apparatus in accordance with the invention actually allows the remote control of chemical or similar operations, to record cycles of such operations, while being sure that the record is correct, and to reproduce at will the recorded cycles.

Referring to FIGURES 24 and 25, there will be seen a work table 200 serving as a support for rails 87 and 88 on which will be mounted an assembly of carriages such as that illustrated in FIGURE 5. It will be recalled that the said assembly supports on the one hand a pipette $p$ for distributing a liquid in receptacles such as 78 disposed on the worktable, or extracting a liquid therefrom, and on the other hand a grip 131 for engaging and depositing such receptacles. It will also be recalled that the said assembly permits moving the pipette and the grip in three rectangular directions $x$, $y$, $z$ and bringing them to multiple predetermined stopping positions, the said stopping positions in the vertical direction $z$ determining a number of horizontal working planes, such for example as the planes $P_1$ and $P_2$ of FIGURE 5, in each of which planes the stopping positions in the transverse direction $x$ and in the front-to-rear direction $y$ are at the crossing points or intersections of an appropriate positioning network or cross-ruling for the apparatus in question.

The said positioning network is represented in FIGURE 25 by crossed transverse and longitudinal lines and its points of intersection by black dots such as 201 at the intersections of these lines. The aforesaid assembly of carriages and the devices by which it is controlled make it possible to bring the pipette or the grip to any crossing point of the illustrated network by a process previously explained, it being assumed that in the assembly here considered the grip is offset forwardly of the pipette exactly by the distance separating two consecutive crossing points in the front-to-rear direction, so that if the pipette $p$ is, for example, in vertical alignment with the crossing point 202 the grip 131 will be situated in vertical alignment with the crossing point 203.

Of course, in other constructional forms, the distance between the pipette and the grip may be different from the space between two consecutive crossing points, and the said distance may be in a transverse direction or in an oblique direction, the essential requirement being that when the pipette is in vertical alignment with a crossing point the grip should also be in vertical alignment with a crossing point. It will also be noted that the meshes of the positioning network may be rectangular or square, the latter form being advantageous in that it permits of disposing a maximum number of receptacles on a given surface.

The receptacles 78 are disposed in racks or repositories such as 204 or 205, of which two constructional forms are shown in FIGURES 25, 26 and 27. The upper rack 204 consists of two plates 206 and 207 connected by two sides 208. The plate 207 is bent in such manner as to fit into a passage 209 defined by two vertical walls 210 and 211 provided in the table 200. The plates 206 and 207 are formed with holes 212 and 213 respectively. The holes 212 are slightly larger than the body of the receptacles 78. The holes 213 are slightly smaller than the said body, which ensures that the receptacles will be maintained in position in the rack. The holes 212 and 213, are positioned in the plates in such manner that their centers reproduce a portion of the positioning network, and the plate 207 is provided with two studs 214 which engage in two holes 215 so located in the worktable that when the rack is positioned above the latter the centers of the holes 212 and 213, and consequently the receptacles disposed in the racks, are positioned at crossing points of the positioning network, as will be seen from FIGURE 25.

The lower rack 205 is similar to the rack 204, but it is designed to engage in the passage 209 and bear against two ledges 216 or against the intermediate wall 216'. It comprises an upper plate 217 formed with holes 212a, a lower plate 218 formed with holes 213a, and two sides 219 connecting the said two plates together. The plate 218 is in addition formed with two small holes 220 engaging over studs 221 positioned in such manner that when the rack 205 is placed in position the centers of the holes 212 and 213a are positioned at crossing points of the positioning network.

It will be apparent from the foregoing that access to the receptacles of the lower rack 205 can be obtained either by removing the upper rack 204 or by removing the receptacles contained therein. In the latter case, the pipette can pass through the holes 212 and 213 in the upper rack. It will also be noted that the pipette can be brought below the lower rack 205 when receptacles are removed from the latter.

It will therefore be apparent that the use of banks of racks formed with holes positioned in vertical alignment with the crossing points of the positioning network makes it possible to use the said network at a number of levels. The worktable has a number of superposed working levels and not merely a single surface, thus the number of operations which it is possible to perform at a single level on a table of given dimensions is multiplied by the number of levels, which results in a considerable reduction of the overally dimensions and of the cost of the apparatus in question.

It will also be observed that the positioning of a rack brings about the exact positioning of the receptacles contained therein. The operator need not concern himself with the accuracy of this positioning and has to pay attention only to the best location to be given to the rack with a view to performing a succession of given operations by means of the apparatus. With regard to this location, it will be noted that the apparatus can effect it automatically, it merely being necessary to adapt the rack for this purpose, for example to provide thereon a member such as the flanged projections 222 (see FIGURE 28) which can be gripped by the grip 131 in order to lift the rack and to convey it to the desired position of the worktable.

The apparatus will be designed in accordance with the operations for which it is more especially intended. Thus, in the example illustrated in FIGURES 24 and 25 a centrifuge 223 is provided, of which the admission aperture 224 is positioned in vertical alignment with the crossing point 225 of the positioning network. Through this aperture, the grip 132 can deposit receptacles in and remove them from troughs in the centrifuge, which are previously held fast in succession in vertical alignment with the crossing point 225 by means of a positioning device specially designed for this purpose.

An agitating device is also provided, which comprises a plate 226 to which a rapid reciprocating movement can be imparted in the front-to-rear direction with the aid of a mechanism disposed in the table. The said mechanism is not illustrated in the drawing, but it can readily be conceived. The rack containing the receptacles to be agitated will be disposed on the plate 226 and held fast therewith by appropriate means, for example with the aid of two studs fixed to the plate 226 and engaging in two holes formed in the lower surface of the rack. The plate 226 will preferably be readily detachable to afford access to the working plane situated below it when necessary.

The intermediate wall 216' is formed with three apertures 227, 228 and 229. The aperture 227 is intended for the delivery by means of the grip 131 of dirty receptacles which will be conveyed therefrom to a washing device not shown in the drawing. The aperture 228 is intended for the return of the washed receptacles from the washing device. The grip 131 passes the washed receptacles one-by-one through the said aperture and automatically brings them to the desired point of the worktable. The aperture 229 affords access to a photocolorimeter 230 disposed in the working table. It is through this aperture that the grip 131 can lower special receptacles into the photocolorimeter and that the pipette $p$ can successively distribute to each of the lowered receptacles the reactant by means of which the solutions contained in each of them can be titrated in accordance with the general particulars given in IV, above. After this titration, the grip 131 will raise the receptacles through the aperture 229, and the photocolorimeter will be released to carry out other titrations.

There will also be seen on the worktable an oven 230a which is provided with a door 231 arranged to open and close automatically. Fixedly mounted on the said door is a rack 232 similar to the racks 204 and 205 already described, which is intended, like the latter, to receive receptacles such as 78. The oven is so designed that, on opening of its door 231, which pivots about the vertical pin 233, the rack 232 is brought above a special rack 234, in such manner that the receptacles in the rack 232 are thus brought to crossing points of the positioning network. The rack 234 is of special design in that it is constructed in the form of a fluid-tight container which can be used as a water bath. However, it comprises, like the other racks, an upper plate 235 formed with holes such as 212 which determine the position of the receptacles in the said rack, and the centers of which are situated at crossing points of the positioning network.

The racks hereinbefore described are specially designed to receive receptacles adapted to be taken up, moved and deposited by the grip 131 such as flasks or bottles. Nevertheless, it is possible without departing from the spirit of the present invention to provide racks designed for other functions. Thus, the rack 237 illustrated in FIGURES 24 and 29 is designed to receive sample tubes 238, such as those used in serological reactions. These tubes are disposed in holes aligned over the rack and situated very close together in the front-to-rear direction, their spacing corresponding to the spacing between the pipettes of the multiple-pipette unit previously mentioned, and of which a constructional example is illustrated in FIGURE 23. In this case, all the pipettes simultaneously distribute liquids in their respective tubes, or extract liquids therefrom. The front-to-rear movement of the pipettes is therefore unnecessary and consequently it is not essential for all the tubes to be positioned at crossing points of the positioning network. For example, it is merely necessary for one tube out of two to be so positioned, as indicated in FIGURE 29 by the distribution of the black dots representing the crossing points of the positioning network when the rack 237 is positioned on the worktable.

It may be desirable to provide for the pipette unit additional stopping positions between the crossing points of the positioning network. For example, if additional stopping positions are provided at the mid-points of the spaces between successive crossing points in a common front-to-rear direction, it will be possible successively to distribute liquid with a single pipette in all the tubes of one row extending from front to rear of the rack 237.

The rack 239 illustrated in FIGURES 24 and 30 is designed to receive parallelepipedic dishes 240 intended, for example, to constitute storage means for liquids or reactants, which the pipette will withdraw as required. The dishes 240 are assembled within the rack 239 in the manner of a set of bricks, and it will be noted that the crossing points of the positioning network which are represented by black dots in FIGURE 7 are situated within the dishes 240.

It will further be noted that the worktable is provided with a washing tank 241 (see FIGURES 25 and 26) having water circulating therein, the washing water being supplied and discharged through ducts 242 and 243 respectively. The pipette can enter the tank 241 through holes 244 formed in the worktable, and positioned at crossing points of the positioning network. Further washing tanks similar to the tank 241 may be provided at other points along the table in order that one such tank may always be situated close to the point at which the pipette is situated. There will be seen in FIGURE 25 another such tank at 241', with admission holes 244'.

Naturally, the invention is not limited to the examples described or illustrated, and many constructional modifications may be envisaged without departing from the scope thereof. Thus, the racks and the means by which they are positioned on the worktable may be of different form from those illustrated, the essential requirement being that it should be possible to position and superpose the racks without difficulty and that correct positioning of the receptacles should be ensured. On the other hand, the devices performing particular functions, such as the centrifuge, the photocolorimeter and the oven may be designed, and disposed on the worktable, otherwise than as illustrated, and devices performing other functions may be provided, such devices being either provided in addition to those here described or substituted for some of them. Also, the grip for taking up and depositing the receptacles may be replaced by any other device designed to take up and release a receptacle, as required, the said receptacle being, if necessary, specially adapted to the operation of this device. Moreover, the invention may be applied to apparatus in which the pipette is moved along semi-polar coordinates. In this case, the movements in the perpendicular rectilinear lines $x$ and $y$ will be replaced by movements along concentric circles and in directions radiating from the center of these circles. Instead of a positioning network having rectangular meshes, a network having trapezoidal meshes will then be employed, the crossing points of the said network being situated at the intersections of concentric circles or arcs of circles and of radii extending from the centers of the said circles. Finally, it is to be noted that the pump unit group with two motors and gear differential may be replaced by a motor pump group with a variable speed motor; that the level sensing device with a photoelectric cell may be replaced by a level sensing device of another type; and that the magnetophone may be replaced by another recording reproducing device, the essential being that this device should allow the erasure of an instruction, immediately after its recording, without any risk to erase the previously recorded instructions.

What I claim is:

1. An apparatus for automatically performing chemical operations, comprising, in combination, a worktable, a multiplicity of receptacles supported on said worktable certain of which at least contain liquids, a multiplicity of pipettes one of which acts as a main pipette, a motor-driven pump rotatable in both directions, tube means connecting said pump to said pipettes and to the atmosphere so that a fluid may pass through the pipettes, means for controlling said pump in accordance with the desired passages of fluid through said pipettes, and means supporting said pipettes above the worktable for displacement parallel to the axes of a system of three coordinates one of which is vertical in order to bring each pipette in vertical alignment with any receptacle and subsequently to move said pipette down and up with respect to said receptacle, whereby liquid may be removed by any pipette from a receptacle and discharged into any other receptacle in amounts corresponding to the desired passages of fluid through said pipette.

2. Apparatus for automatically performing a chemical operation comprising a worktable, a plurality of receptacles supported on said worktable at predetermined locations of a positioning network, said receptacles being adapted for containing liquids, a pipette, a motor driven pump rotatable in opposite directions, means connecting said pump to said pipette and to the atmosphere for respectively establishing suction and pressure in said pipette dependent upon the direction of rotation of said pump, means for controlling said pump in order to selectively draw liquid into said pipette and discharge liquid from said pipette in desired quantities, means supporting said pipette from said worktable for vertical movement and for movement between the locations of the positioning network to bring the pipette into vertical alignment with any of the locations of the positioning network and thereby with the receptacle located thereat, such that the pipette can be raised from and lowered into the receptacles at said locations whereby liquid may be removed from or discharged into any of the receptacles in desired quantities.

3. Apparatus as claimed in claim 2 comprising a plurality of additional pipettes identical to the first said pipette, and a block supporting said plurality of pipettes in detachable manner with respect to the first said pipette and parallel thereto, and means connecting the additional pipettes to the motor-driven pump.

4. An apparatus, according to claim 2, wherein the means for controlling the pump comprises a liquid level detector including an element movable along the pipette for detecting the level of the liquid therein, means for producing a level detecting voltage, a displaceable member for adjusting said voltage in accordance with the required level of liquid in the pipette, driving means for simultaneously displacing said member and said element so that there corresponds to each value of said voltage a position of said element along the pipette; means for starting and stopping the motor driven pump as the pipette attains predetermined respective down and up levels, and means for stopping said pump as soon as the liquid attains the level corresponding to the adjusted voltage in the pipette then stationary in its lower position.

5. An apparatus, according to claim 2, wherein the means for controlling the pump comprises a liquid level detector including an element movable along the pipette for detecting the level of the liquid therein, means for producing a level detecting voltage, a displaceable member for adjusting said voltage, a device for producing an index voltage, a device for adjusting said index voltage in accordance with the required level of liquid in the pipette, a device for comparing said level detecting and index voltages, driving means connected to and controlled by said comparing device for displacing, on the one hand, said member so that the level detecting voltage is adjusted to a value equal to that of said adjusted index voltage and, on the other hand, said element so that there corresponds to each value of said level detecting voltage a position of said element along the pipette, means for starting and stopping the motor-driven pump as the pipette attains predetermined respective down and up levels, and means for stopping said pump as soon as the liquid attains the level corresponding to the adjusted voltage in the pipette then stationary in its lower position.

6. An apparatus according to claim 2, wherein the means for controlling the pump comprises means for starting the motor-driven pump, and a drop-counting device including a means removably disposed at the bottom of the pipette for providing an electric pulse at each passage of a drop distributed through said pipette, under the action of the motor-driven pump, and a pulse counter for counting the electric pulses thus obtained and on which the operator predisplayed a number of pulses equal to the number of drops corresponding to the desired passage of fluid through the pipette, and means interconnecting said pulse counter and said motor-driven pump for stopping the latter when the number of counted pulses corresponds to said predisplayed number.

7. An apparatus for automatically performing chemical operations, comprising, in combination, a worktable, a plurality of displaceable supporting means supported on said worktable at predetermined locations of a positioning network, receptacles on said supporting means also predeterminately located with respect to said network certain of which receptacles at least contain liquids, a plurality of pipettes, a motor-driven pump rotated in both directions, tubes connecting said pump to each pipette and to the atmosphere so that each pipette may suck and deliver a fluid according to the rotary direction of said pump, displacing means on said worktable carrying each pipette and said pump for displacing the latter parallel to the axes of a system of three coordinates one of which is vertical in order to bring each pipette in registered relationship with any of the locations of said positioning network and thereby the receptacle located thereat and subsequently to move said pipette down and up, means for predetermining the amount of liquid to be removed by each pipette from a receptacle containing a liquid and to be discharged from said pipette into another receptacle during its down and up movements, gripping means on said displacing means vertically movable thereon for transferring, on the one hand, any receptacle from one supporting means to another and, on the other hand, any supporting means to another position on said worktable, and means for controlling said pump, displacing means, predetermining means and gripping means in a sequentially timed predetermined order.

8. An apparatus for automatically performing chemical operations and physical treatments related to said operations comprising, in combination, a worktable, a plurality of displaceable supporting means supported on said worktable at predetermined locations of a positioning network, receptacles on said supporting means also predeterminately located with respect to said network certain of which receptacles at least contain liquids, physical treatment devices supported on said worktable at predetermined locations, a plurality of pipettes, a motor-driven pump rotatable in both directions, tubes connecting said pump to each pipette and to the atmosphere so that each pipette may suck and deliver a fluid according to the rotary direction of said pump, displacing means on said worktable carrying each pipette and said pump for displacing the latter parallel to the axes of a system of three coordinates one of which is vertical in order to bring each pipette in registered relationship with any of the locations of said positioning network and thereby with the receptacle located thereat and subsequently to move said pipette down and up, means for predetermining the amount of liquid to be removed by each pipette from a receptacle containing a liquid and to be discharged from said pipette into another receptacle during its down and up movements, gripping means on said displacing means vertically movable thereon for transferring, on the one hand, any receptacle from one supporting means to another and to any physical treatment device and, on the other hand, any supporting means to another position on said worktable and to the physical treatment devices, and means for controlling said pump, displacing means, predetermining means and gripping means in a sequentially timed predetermined order.

9. An apparatus according to claim 8, wherein the displacing means comprises a first carriage displaceable with respect to the worktable in both transverse directions, means for driving said first carriage, a second carriage mounted on said first carriage, displaceable in a front-to-rear direction and reversely with respect to said worktable, and on which each pipette is vertically movable, means for driving said second carriage, means for driving each pipette in a vertical direction, and means for stopping each one of said three driving means as soon as each pipette is disposed in the required position with respect to the network, and wherein the gripping means comprises a grip unit vertically movable on said second carriage and having claws articulated thereon, a vertically movable stop carried by said unit at a level higher than that of said claws for bearing on the top of a receptacle and a supporting means while said unit moves down, means for driving said grip unit, means for opening and closing said claws in order to respectively grasp and release a respective receptacle and supporting means as soon as the stop bears on the receptacle and supporting means to be grasped and the grasped receptacle and supporting means attains its releasing position, respectively, and means for stopping said grip unit driving means as soon as said grip unit attains its upper position.

10. An apparatus for automatically performing chemical operations and physical treatments and measures related to said operations, comprising, in combination, a worktable having superposed horizontal working planes, several displaceable supporting means supported on said working planes at predetermined positions of a positioning network, receptacles on said supporting means also predeterminately located with respect to said network, certain of which receptacles at least contain liquids, devices for performing physical treatments and measures supported by said worktable at predeterminately located positions of said network, a movable pipette block, a set of parallel pipettes on said block one of which acts as a main pipette, a pump rotatable in both directions and having two orifices acting as inlet and outlet orifices and reversely according to the rotary direction of said pump, a first electric motor means for driving said pump and mechanically connected thereto, tubes respectively connecting one of the pump orifices to the upper ends of said pipettes and the other orifice to atmosphere, whereby each pipette may suck and deliver a fluid according to the rotary direction of the pump, displacing means on said worktable carrying said pipette block and said pump with its associated electric motor means for displacing the latter in the vertical direction and in at least one of the horizontal directions defining a system of coordinates corresponding to the network, a second electric motor means on said displacing means for controlling the displacements thereof and those of the pipette block thereon, a transmission means interconnecting said second electric motor means and said displacing means, a liquid level detector means for the main pipette movable therealong and carried by said pipette block for stopping said first electric motor means as soon as the level of the liquid in said main pipette reaches a predetermined detected level, a third electric motor means on said pipette block for moving said detector means, a first electric device on said pipette block connected to said third electric motor means and adjustable in relation to a predetermined volume of liquid to be removed by each pipette from a receptacle containing said liquid and a predetermined amount of said removed liquid to be discharged from said pipette into another receptacle for respectively energizing and de-energizing said third electric motor means as soon as a removing and discharging operation is to be performed and as soon as the detector means attains the required level along the main pipette, a grip unit vertically movable on said displacing means and having articulated claws for grasping and releasing a receptacle and a supporting means, whereby any receptacle may be transferred from one supporting means to another in either of the working planes and to a physical device while a supporting means may be transferred to another position on either of the working planes and to the physical devices, a fourth electric motor means on said displacing means mechanically connected to said grip unit for controlling the vertical movements thereof, a second electric device on said grip unit for controlling the closure and the opening of said claws, a first electric circuit having, on the one hand, control terminals and, on the other hand, relays, triggers and rotating contactors for connecting said control terminals with the first, second and third electric motor means and with the first electric device, a second electric circuit having, on the one hand, a set of control terminals and, on the other hand, triggers for connecting the control terminals of said set with the fourth electric motor means and with said second electric device, and means for automatically applying a voltage to at least certain of the control terminals of said both circuits through the corresponding relays, triggers and rotating contactors in order to energize and deenergize the corresponding electric motor means and devices in a sequentially timed predetermined order constituting the cycle of the successive operations which are necessary for performing a desired chemical operation and the related physical treatments and measures.

11. An apparatus according to claim 10, wherein the claws are offset with respect to the pipettes and wherein the displacing means simultaneously brings the pipettes and the claws into a number of predetermined stopping positions, the stopping positions in the vertical direction being determined by the working planes in each of which the stopping positions in the two horizontal directions are situated at crossing points of the positioning network.

12. An apparatus according to claim 11, wherein each receptacle supporting means is constituted by a rack having two distant and superposed plates the upper one of which is integral with a flanged projection to be grasped by the claws and is provided with holes slightly larger than the receptacles to be supported by the rack, while the lower plate is provided with holes slightly smaller than said receptacles and respectively in vertical alignment with the upper holes, said flanged projection and said vertically aligned upper and lower holes being distributed at crossing points of the positioning network, whereby when several racks are superposed on the working planes of the worktable each pipette or the claws can reach a lower working plane either by removal of at least one upper rack, or, after removal of at least one receptacle, through the upper and lower holes of the upper racks.

13. An apparatus according to claim 12, wherein certain of the racks are arranged to support bottles, others to support tubes and others to support parallelepipedic dishes constituting storage means for liquids and reactants.

14. An apparatus according to claim 11, wherein the devices for performing physical treatments and measures include a centrifuge, an agitating device, a washing device, a photocolorimeter, an oven, a water bath and at least one washing tank.

15. An apparatus according to claim 14, wherein the device for performing physical treatments is a washing device disposed within the worktable and wherein said worktable is provided with, at two crossing points of the positioning network, two apertures affording access to below the table, one of the said apertures being intended for discharging the dirty receptacles one by one towards the washing device, and the other for extracting one by one the clean receptacles coming from the washing device.

16. An apparatus according to claim 14, wherein the device for performing physical treatments is an oven having a door which opens by pivoting about a vertical axis and on which there is fixed a first rack, a second rack similar to the first one and acting as a water bath being disposed on the worktable laterally with respect to said door at a level lower than that of the lower edge of said door with vertically aligned upper and lower holes positioned at crossing points of the positioning network, said second rack having an outline the same as that of said first rack when brought above said second rack by opening of said door, so that the receptacles disposed in the first rack are thus brought to crossing points of the positioning network.

17. An apparatus according to claim 10, wherein the first electric motor means mechanically connected to the pump comprises two electric motors rotatable in both directions, an epicyclic gear train having two driving shafts and one driven shaft connected to the pump, transmission means respectively connecting said motors to said driving shafts, whereby by combining the speeds and directions of rotation of said motors the pump may be driven at four different speeds in each direction, a cam mechanically connected to said driven shaft, and two normally open contacts in the path of the cam inserted in the first electric circuit for interrupting the suction and the delivery of the pump, respectively, under the action of said cam.

18. An apparatus according to claim 10, wherein one of the physical devices consists of a photocolorimeter and wherein one of the relays of the first electric circuit is connected to said photocolorimeter and has a normally closed contact inserted in the line feeding the first electric motor means, whereby when a pipette distributes a liquid in a receptacle which has been transferred to said photocolorimeter, the latter applies a voltage to said relay in order to open said contact as soon as the solution contained in the receptacle reaches a predetermined colored state, whereby said first electric motor means stops as well as the pipette discharging.

19. An apparatus according to claim 10, wherein the displacing means, the second electric motor means and the transmission means comprise a first carriage displaceable with respect to the worktable in both transverse directions, a second carriage mounted on said first carriage, displaceable in a front-to-rear direction and reversely with respect to said worktable and on which the pipette block is vertically movable, said carriages moving the pipette block to crossing points of the positioning network, a stationary transverse rack mounted on the worktable, a gear carried by the first carriage and engaging said rack, a first electric motor carried by said first carriage and mechanically connected to said gear, means for transversely guiding said first carriage on said worktable, a front-to-rear directed screw carried by the first carriage, a nut carried by the second carriage and engaging said screw, a second electric motor carried by said first carriage and mechanically connected to said screw, means for guiding the second carriage on the first carriage, a vertical screw carried by the second carriage, a second nut carried by the pipette block and engaging said vertical screw, a third electric motor carried by the second carriage and mechanically connected to said vertical screw, means for guiding the pipette block on the second carriage, two normally closed contacts inserted in the first electric circuit for allowing the respective energization of the first and second electric motors, means controlled by said first and second electric motors for opening said normally closed contacts when the first and second carriage have been brought in their predetermined positions, respectively, run and normally open contacts carried by the pipette block and inserted in said first electric circuit, stops respectively closing said run and contacts as soon as the pipette block attains its upper and lower positions for de-energizing the third electric motor, and means for selecting said lower position.

20. An apparatus according to claim 19, wherein the grip unit, the fourth electric motor means and the second electric device comprise a fourth electric motor carried by the second carriage and rotatable in both directions, means for vertically guiding the grip unit on said second carriage, a transmission interconnecting said unit and said fourth motor, a vertically movable stop carried by said unit at a level higher than that of said claws for bearing on the top of a receptacle and a supporting means while said unit moves down, an electromagnet carried by said unit and mechanically connected to the claws for opening the latter when energized, mechanical means for closing said claws when said electromagnet is de-energized, a first normally open contact inserted in the second electric circuit and carried by the grip unit for de-energizing said fourth motor and said electromagnet when closed as soon as said unit reaches its upper position, two triggers in said second electric circuit for respectively energizing and de-energizing said electromagnet and simultaneously energizing said fourth motor to induce a descent of said unit when said first normally open contact is open, and a second normally open contact inserted in said second electric circuit and adapted to be closed by said stop for respectively de-energizing and energizing said electromagnet after actuation of the energizing and de-energizing triggers and for simultaneously energizing said fourth motor to induce an upward movement of said unit.

21. An apparatus according to claim 20, wherein the liquid level detector means, the third electric motor means and the first electric device comprise an electric liquid level detector having an element movable along the main pipette for detecting the level of the liquid therein, means for producing a level detecting voltage, a displaceable member for adjusting said voltage, a device for producing an index voltage, a rotating contactor in said first electric circuit for adjusting said index voltage in accordance with the required level of liquid in the main pipette, an electric device for comparing said level detecting and index voltages, a fifth electric motor mechanically connected to said member and element and electrically connected to and controlled by said comparing device for displacing, on the one hand, said member so that the level detecting voltage is adjusted to a value equal to that of said adjusted index voltage and, on the other hand, said element so that there corresponds to each value of said level detecting voltage a position of said element along the pipette, a second electric liquid level detecting element fixed at the level of the top of the main pipette, contacts in said first electric circuit operated by the level detectors for de-energizing the first electric motor means as soon as the liquid attains, on the one hand, the level corresponding to the adjusted level detecting voltage in the main pipette then stationary in its lower position and, on the other hand, as soon as said liquid attains the top of said main pipette when the index detecting voltage is adjusted for a liquid level at the least equal to that of said top, a drop-counting device including electric means removably disposed at the bottom of the main pipette for providing an electric pulse at each passage of a drop distributed through said pipette, under the action of the pump, and an electric pulse counter for counting the electric pulses thus obtained and on which the operator predisplayed a number of pulses equal to the number of drops corresponding to the desired passage of fluid through the pipette, and relays and triggers of said first electric circuit interconnecting said pulse counter and said first electric motor means for de-energizing the latter when the number of counted pulses corresponds to said predisplayed number.

22. An apparatus according to claim 10, wherein the means for automatically applying a voltage to at least certain of the control terminals of the two electric circuits comprises an electric coding device for converting each of the instructions constituting the cycle concerned, one after the other, into a group of electric pulses characteristic of the corresponding instruction, an electric device connected to said coding device for recording and reproducing from the thus obtained recording each group of characteristic pulses, an electric decoding device connected to said recording device for converting each reproduced group of characteristic pulses into an electric voltage and having instruction terminals respectively connected to the control terminals of said both electric circuits, means to apply said voltage to an instruction terminal connected to the control terminal corresponding to the instruction in question, whereby said instruction is fulfilled, and an electric coordinating and safety device connected to said coding and decoding devices for avoiding any mixing of instructions in the performance thereof and for returning the decoding device, after the performance of each instruction, into the position for the performance of a further instruction.

23. An apparatus according to claim 22, wherein the coding and decoding devices are each provided with a step-by-step selector, the coding selector sending during the coding operation synchronizing pulses which are recorded and reproduced simultaneously with an instruction, by the recording and reproducing device, said reproduced synchronizing pulses being applied to the decoding selector for controlling the step-by-step advance thereof.

24. An apparatus according to claim 23, wherein the means to apply the electric voltage to the instruction terminals comprises main relays having self-energizing contacts, actuated selectively in accordance with the instruction under consideration by the decoding selector, and an assembly of secondary relays arranged and connected in such manner that when they are selectively actuated by the main relays they transmit to that one of the instruction terminals which corresponds to the instruction in question the electric voltage emanating from the feed line of the self-energizing contacts of the main relays.

25. An apparatus according to claim 23, wherein the device for recording and then reproducing the pulses is a magnetic tape recorder.

References Cited in the file of this patent

UNITED STATES PATENTS

| | | |
|---|---|---|
| 2,332,157 | Mapson | Oct. 19, 1953 |
| 2,624,656 | Andrews et al. | Jan. 6, 1953 |
| 2,550,701 | Lardy | May 1, 1951 |
| 2,710,715 | Gorham | June 14, 1955 |
| 2,950,177 | Brown et al. | Aug. 23, 1960 |